(12) United States Patent
Maeda

(10) Patent No.: US 9,223,487 B2
(45) Date of Patent: Dec. 29, 2015

(54) ELECTRONIC APPARATUS, METHOD OF CONTROLLING THE SAME, AND RELATED COMPUTER PROGRAM

(75) Inventor: Yoshie Maeda, Kanagawa-ken (JP)

(73) Assignee: JVC KENWOOD Corporation, Kanagawa (JP)

(*) Notice: Subject to any disclaimer, the term of this patent is extended or adjusted under 35 U.S.C. 154(b) by 562 days.

(21) Appl. No.: 13/604,942

(22) Filed: Sep. 6, 2012

(65) Prior Publication Data

US 2013/0076668 A1 Mar. 28, 2013

(30) Foreign Application Priority Data

Sep. 28, 2011 (JP) ................... 2011-213101

(51) Int. Cl.
G06F 3/041 (2006.01)
G06F 3/0484 (2013.01)
G06F 3/0488 (2013.01)

(52) U.S. Cl.
CPC ........ *G06F 3/04845* (2013.01); *G06F 3/04842* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| 2007/0229471 | A1* | 10/2007 | Kim et al. ................ 345/173 |
| 2008/0168403 | A1* | 7/2008 | Westerman et al. .......... 715/863 |
| 2011/0163968 | A1 | 7/2011 | Hogan |

FOREIGN PATENT DOCUMENTS

| JP | H07-230352 | 8/1995 |
| JP | 2001-005599 | 1/2001 |
| JP | 2001-290585 | 10/2001 |
| JP | 2001-356878 | 12/2001 |
| JP | 2006-039819 | 2/2006 |

* cited by examiner

Primary Examiner — Nicholas Lee
(74) Attorney, Agent, or Firm — Louis Woo

(57) ABSTRACT

Objects are indicated on a display. A touch panel is superposed on the display. An acquiring section operates for detecting user's touches to the touch panel and acquiring positions of the user's touches to the touch panel as touch positions. A decision is made as to whether or not the distance between first and second touch positions decreases in accordance with the lapse of time. A selecting section operates for setting a rectangular area with respect to the display and selecting an object or objects contained in the rectangular area in cases where it is decided that the distance between the first and second touch positions decreases in accordance with the lapse of time. Two opposite corners of the rectangular area are respectively coincident with the first and second touch positions occurring at an initial stage of the user's touches to the touch panel.

12 Claims, 19 Drawing Sheets

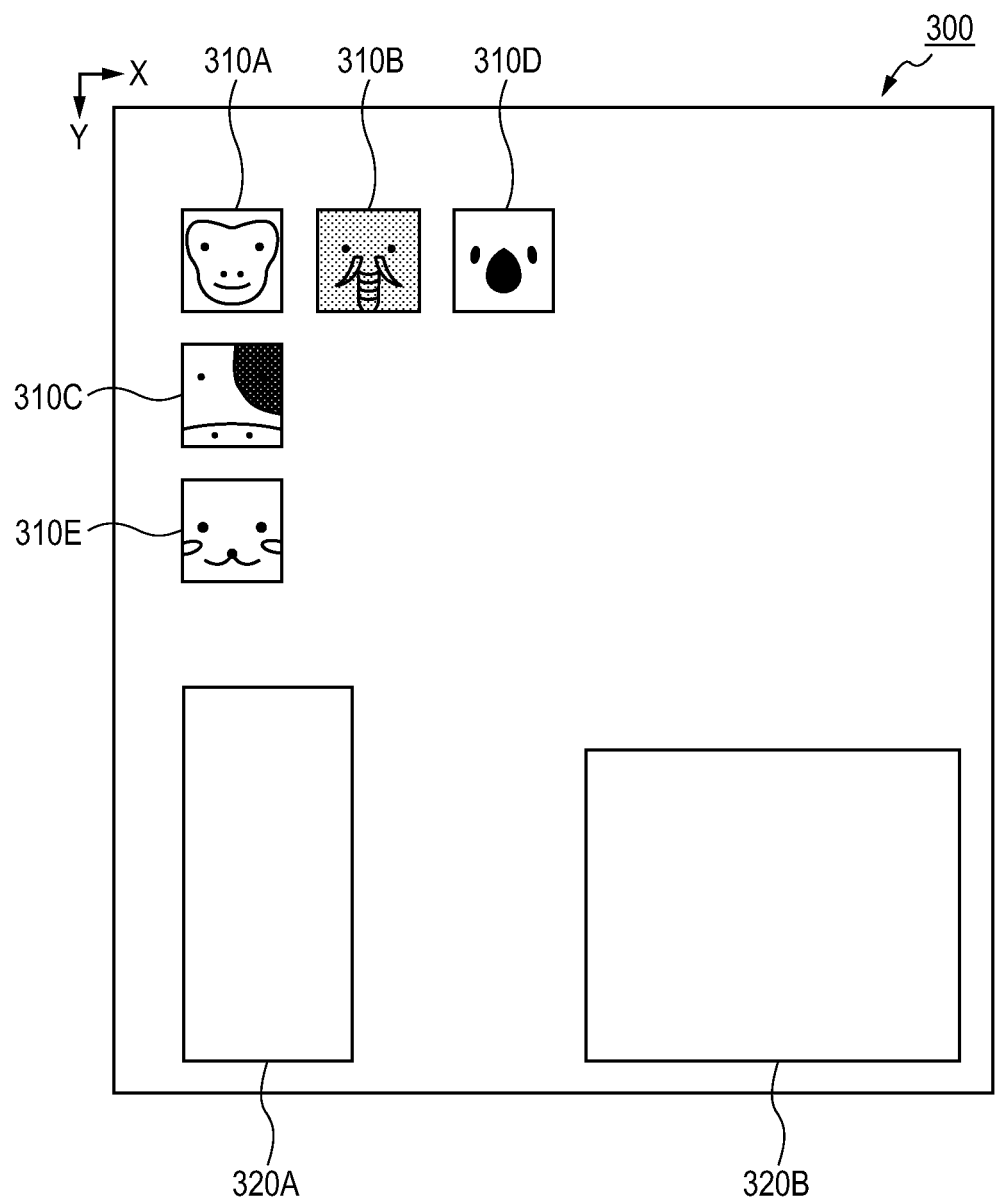

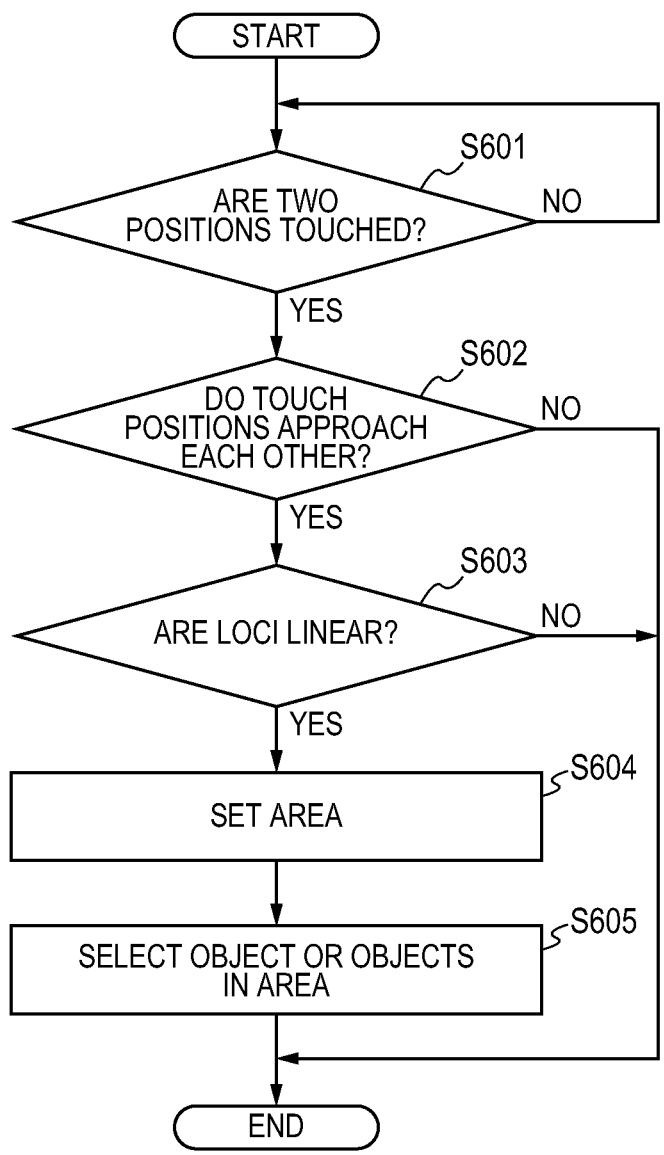

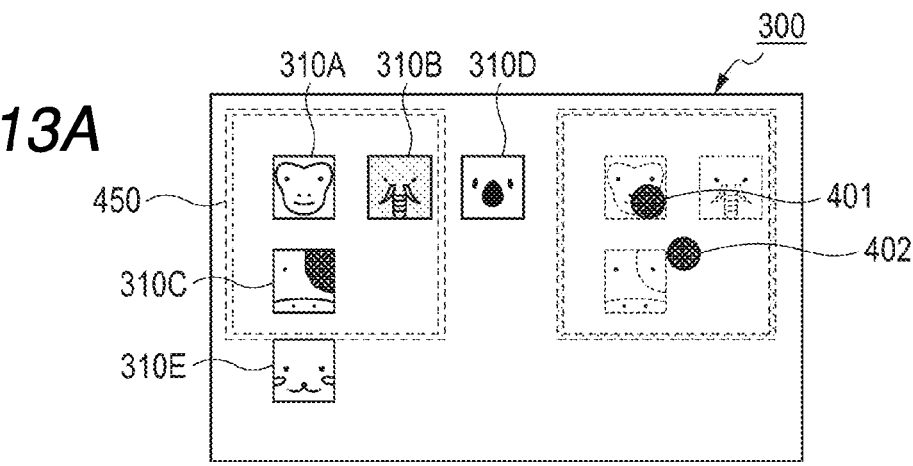
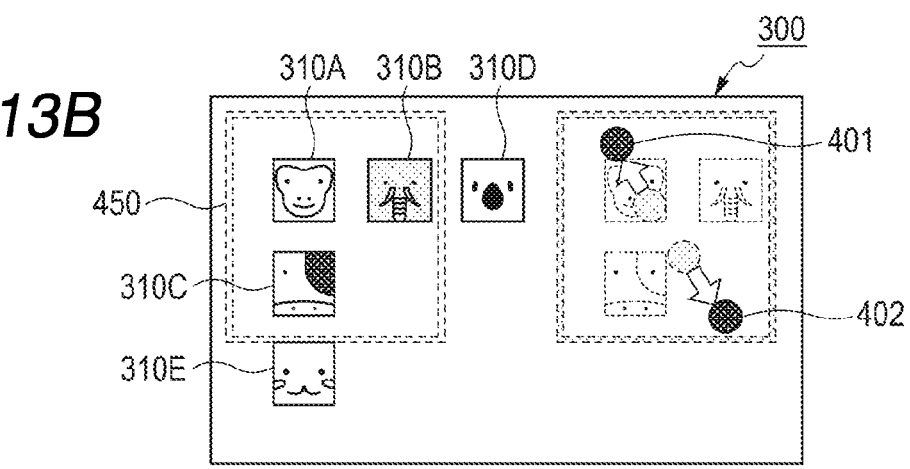
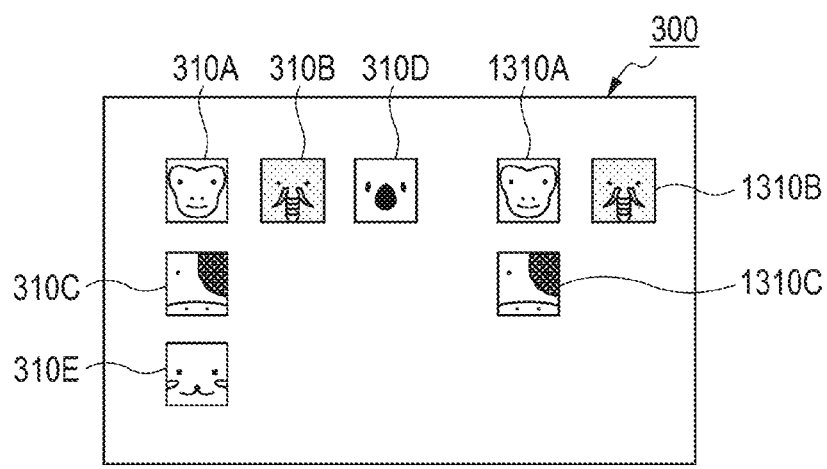

ELECTRONIC APPARATUS, METHOD OF CONTROLLING THE SAME, AND RELATED COMPUTER PROGRAM

CROSS-REFERENCE TO RELATED APPLICATIONS

This application claims priority from Japanese patent application number 2011-213101, filed on Sep. 28, 2011, the disclosure of which is hereby incorporated by reference.

BACKGROUND OF THE INVENTION

1. Field of the Invention

This invention relates to an electronic apparatus with a touch panel, a method of controlling the apparatus, and a related computer program.

2. Description of the Related Art

Input apparatuses including touch panels have widely been spread. In such an input apparatus, a user can select an object as a command target or decide command contents by bringing, for example, user's fingertip into contact with a touch panel.

Japanese patent application publication number 2001-356878 discloses an icon control method having the following steps. When a user touches a touch panel in a manner such as to take a file icon between user's fingers, the file icon is recognized as selected one to be moved. Then, the user releases the selected file icon by separating user's fingers therefrom. Thereafter, the user touches the touch panel in a manner such as to take a folder icon between user's fingers. In this case, the folder icon is recognized as a destination, and a file denoted by the file icon is moved into a folder denoted by the destination folder icon.

In the method of Japanese application 2001-356878, to select a file icon on the touch panel, the user is required to bring user's fingers into contact with the periphery of the file icon. Accordingly, the user needs to perform fine positional control of user's fingers. In the case where another process such as a copying process is to be implemented instead of file movement, the user is required to give a command via a desired button icon on the touch panel in advance or perform operation while pressing a specified key. Thus, the user needs to take troublesome actions.

SUMMARY OF THE INVENTION

It is a first object of this invention to provide an electronic apparatus designed so that a user can give a command for a process by easy operation.

It is a second object of this invention to provide a method of controlling an electronic apparatus which allows a user to give a command for a process by easy operation.

It is a third object of this invention to provide a computer program for an electronic apparatus which allows a user to give a command for a process by easy operation.

A first aspect of this invention provides an electronic apparatus comprising a display; an indicating section for indicating objects on the display; a touch panel superposed on the display; an acquiring section for detecting user's touches to the touch panel and acquiring positions of the user's touches to the touch panel as touch positions; and a selecting section for deciding whether or not first and second touch positions are acquired by the acquiring section, for calculating a distance between the first and second touch positions, and for deciding whether or not the calculated distance between the first and second touch positions decreases in accordance with the lapse of time. The selecting section is further for setting a rectangular area with respect to the display and selecting an object or objects contained in the rectangular area in cases where it is decided that the first and second touch positions are acquired and the distance between the first and second touch positions decreases in accordance with the lapse of time. Two opposite corners of the rectangular area are respectively coincident with the first and second touch positions occurring at an initial stage of the user's touches to the touch panel.

A second aspect of this invention is based on the first aspect thereof, and provides an electronic apparatus wherein the selecting section is for deriving a first vector extending from the first touch position occurring at a first moment to the first touch position occurring at a second moment after the first moment, for deriving a straight line connecting the first and second touch positions occurring at the first moment, for deriving a second vector extending from the second touch position occurring at the first moment to the second touch position occurring at the second moment, for calculating a first angle between the first vector and the straight line, for calculating a second angle between the second vector and the straight line, for deciding whether or not the first angle is smaller than a prescribed angle, and for deciding whether or not the second angle is smaller than the prescribed angle. The selecting section is for setting the rectangular area and selecting the object or objects contained in the rectangular area in cases where it is decided that the distance between the first and second touch positions decreases in accordance with the lapse of time, the first angle is smaller than the prescribed angle, and the second angle is smaller than the prescribed angle.

A third aspect of this invention is based on the first aspect thereof, and provides an electronic apparatus further comprising a moving section for deciding whether or not the distance between the first and second touch positions is substantially constant after the object or objects contained in the rectangular area are selected by the selecting section, for deciding whether or not the first and second touch positions are slid in substantially a same direction after the object or objects contained in the rectangular area are selected by the selecting section, and for, in cases where it is decided that the distance between the first and second touch positions is substantially constant and the first and second touch positions are slid in substantially a same direction, moving the selected object or objects along said same direction.

A fourth aspect of this invention is based on the third aspect thereof, and provides an electronic apparatus wherein the moving section is for calculating a first distance between the first and second touch positions occurring at a first moment, for calculating a second distance between the first and second touch positions occurring at a second moment after the first moment, for calculating a variation between the first distance and the second distance, for deciding whether or not the calculated variation is within a prescribed allowable range, for deriving a first vector extending from the first touch position occurring at the first moment to the first touch position occurring at the second moment, for deriving a second vector extending from the second touch position occurring at the first moment to the second touch position occurring at the second moment, for calculating an angle between the first and second vectors, for deciding whether or not the calculated angle is smaller than a prescribed angle, and for moving the selected object or objects along said same direction in cases where the calculated variation is within the prescribed allowable range and the calculated angle is smaller than the prescribed angle.

A fifth aspect of this invention is based on the first aspect thereof, and provides an electronic apparatus further comprising a deleting section for deciding whether or not the first and second touch positions are rotated in a same direction after the object or objects contained in the rectangular area are selected by the selecting section, and for deleting the selected object or objects in cases where it is decided that the first and second touch positions are rotated in a same direction.

A sixth aspect of this invention is based on the fifth aspect thereof, and provides an electronic apparatus wherein the deleting section is for deriving a first locus of the first touch position from a first moment to a second moment after the first moment, for deriving a second locus of the second touch position from the first moment to the second moment, for deriving a first circle approximate to the first locus, for deriving a second circle approximate to the second locus, for calculating a distance between the centers of the first and second circles, for deciding whether or not the calculated distance between the centers is smaller than a prescribed distance, and for deleting the selected object or objects in cases where it is decided that the calculated distance between the centers is smaller than the prescribed distance and the first and second touch positions are rotated in a same direction.

A seventh aspect of this invention is based on the first aspect thereof, and provides an electronic apparatus further comprising a copying section for deciding whether or not the distance between the first and second touch positions is substantially constant after the object or objects contained in the rectangular area are selected by the selecting section, for deciding whether or not the first and second touch positions are slid in substantially a same direction after the object or objects contained in the rectangular area are selected by the selecting section, for deciding whether or not the distance between the first and second touch positions increases in accordance the lapse of time after the first and second touch positions are slid in substantially a same direction, for copying the object or objects contained in the rectangular area to generate a copy-resultant object or objects, and for placing the copy-resultant object or objects at locations depending on the first and second touch positions occurring when the user's touches to the touch panel are terminated.

An eighth aspect of this invention is based on the seventh aspect thereof, and provides an electronic apparatus wherein the copying section is for deriving a first vector extending from the first touch position occurring at a first moment to the first touch position occurring at a second moment after the first moment, for deriving a second vector extending from the second touch position occurring at the first moment to the second touch position occurring at the second moment, for deriving a straight line connecting the first and second touch positions occurring at the first moment, for calculating a first angle between the first vector and the straight line, for calculating a second angle between the second vector and the straight line, for deciding whether or not the first and second angles are smaller than a prescribed angle, and for, in cases where it is decided that the first and second angles are smaller than the prescribed angle and thereafter the distance between the first and second touch positions increases in accordance with the lapse of time, copying the object or objects contained in the rectangular area to generate a copy-resultant object or objects and then placing the copy-resultant object or objects at locations depending on the first and second touch positions occurring when the user's touches to the touch panel are terminated.

A ninth aspect of this invention is based on the first aspect thereof, and provides an electronic apparatus further comprising a rearranging section for deciding whether or not the distance between the first and second touch positions is substantially constant after the object or objects contained in the rectangular area are selected by the selecting section, for deciding whether or not the first and second touch positions are vibrated after the object or objects contained in the rectangular area are selected by the selecting section, and for rearranging the objects contained in the rectangular area in cases where it is decided that the distance between the first and second touch positions is substantially constant and the first and second touch positions are vibrated.

A tenth aspect of this invention is based on the ninth aspect thereof, and provides an electronic apparatus wherein the rearranging section is for calculating a first distance between the first and second touch positions occurring at a first moment, for calculating a second distance between the first and second touch positions occurring at a second moment after the first moment, for deciding whether or not the first and second distances are substantially equal, for deriving a first vector extending from the first touch position occurring at the first moment to the first touch position occurring at the second moment, for deriving a second vector extending from the second touch position occurring at the first moment to the second touch position occurring at the second moment, for deciding whether or not the first and second vectors are substantially equal in length and direction, and for rearranging the objects contained in the rectangular area in cases where it is decided that the first and second distances are substantially equal and the first and second vectors are substantially equal in length and direction.

An eleventh aspect of this invention is based on the first aspect thereof, and provides an electronic apparatus further comprising a menu indicating section for calculating a first variation of the first touch position after the object or objects contained in the rectangular area are selected by the selecting section, and for calculating a second variation of the second touch position after the object or objects contained in the rectangular area are selected by the selecting section, for deciding whether or not both the first and second variations remain within a prescribed allowable range for at least a prescribed time interval, and for indicating a list of commands a user can give with respect to the object or objects contained in the rectangular area in cases where it is decided that both the first and second variations remain within the prescribed allowable range for at least the prescribed time interval.

A twelfth aspect of this invention provides a method of controlling an electronic apparatus. The method comprises the steps of indicating objects on a display; detecting user's touches to a touch panel superposed on the display and acquiring positions of the user's touches to the touch panel as touch positions; deciding whether or not first and second touch positions are acquired by the detecting and acquiring step; calculating a distance between the first and second touch positions; deciding whether or not the calculated distance between the first and second touch positions decreases in accordance with the lapse of time; and setting a rectangular area with respect to the display and selecting an object or objects contained in the rectangular area in cases where it is decided that the first and second touch positions are acquired and the distance between the first and second touch positions decreases in accordance with the lapse of time; wherein two opposite corners of the rectangular area are respectively coincident with the first and second touch positions occurring at an initial stage of the user's touches to the touch panel.

A thirteenth aspect of this invention provides a computer program for enabling a computer to function as an indicating section for indicating objects on a display; an acquiring section for detecting user's touches to a touch panel superposed on the display and acquiring positions of the user's touches to the touch panel as touch positions; and a selecting section for deciding whether or not first and second touch positions are acquired by the acquiring section, for calculating a distance between the first and second touch positions, and for deciding whether or not the calculated distance between the first and second touch positions decreases in accordance with the lapse of time; the selecting section being further for setting a rectangular area with respect to the display and selecting an object or objects contained in the rectangular area in cases where it is decided that the first and second touch positions are acquired and the distance between the first and second touch positions decreases in accordance with the lapse of time; wherein two opposite corners of the rectangular area are respectively coincident with the first and second touch positions occurring at an initial stage of the user's touches to the touch panel.

This invention has the following advantage. It is possible to provide an electronic apparatus, a method of controlling an electronic apparatus, and a computer program for an electronic apparatus which allow a user to give a command for a process by easy operation.

BRIEF DESCRIPTION OF THE DRAWINGS

FIG. 3 is a diagram of an example of a large-size picture indicated on a touch screen.

FIG. 6 is a flowchart of a computer program for the selecting process.

FIGS. 13(a), 13(b), and 13(c) are diagrams of examples of the large-size picture which occur during a copying process.

DETAILED DESCRIPTION OF THE INVENTION

An embodiment of this invention will be described later. It should be noted that the embodiment of this invention is for illustrative purpose only, and this invention is not limited to the embodiment thereof. This invention contains many variations, modifications, and changes from the embodiment thereof.

Figure 1:
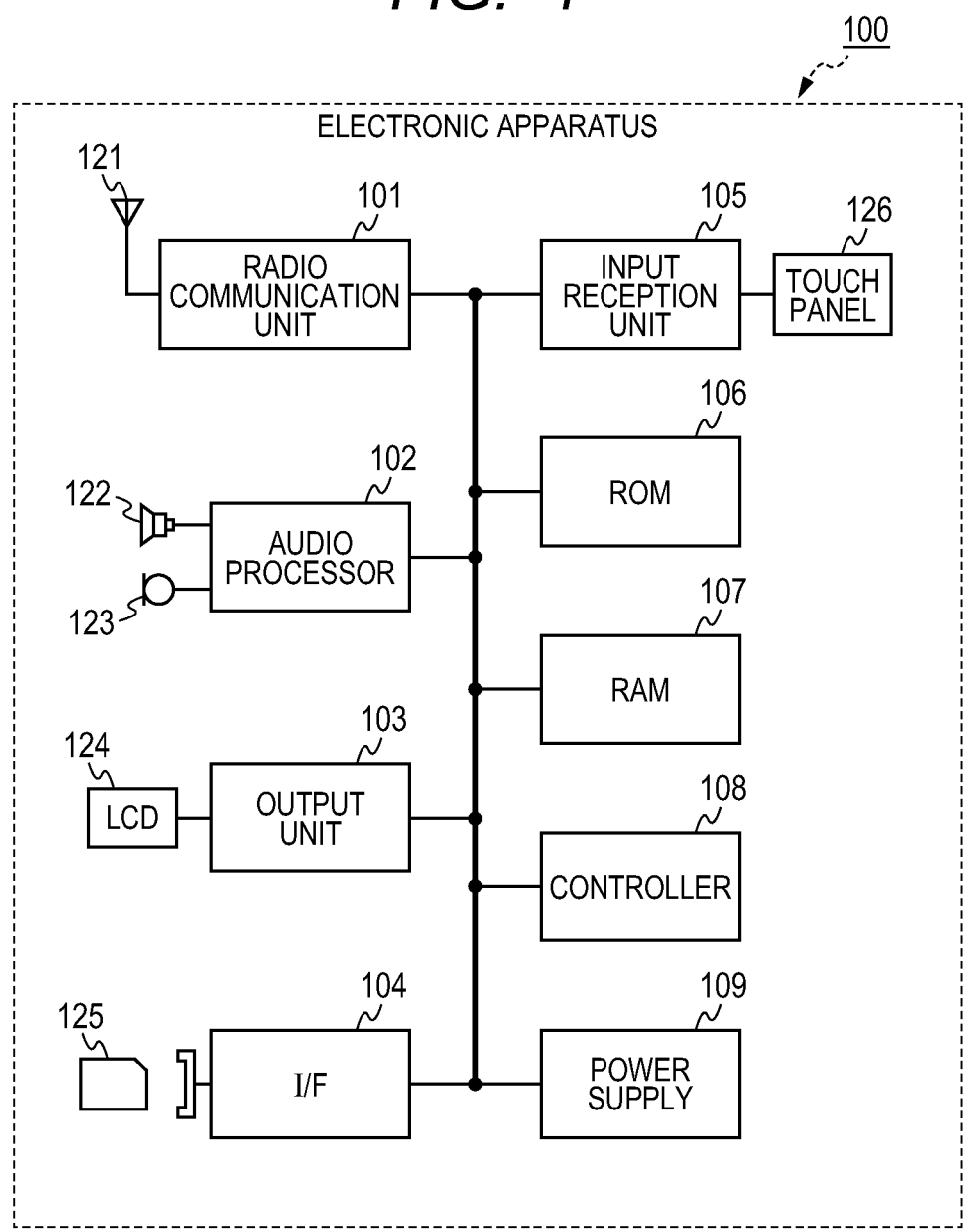
FIG. 1 is a block diagram of an electronic apparatus according to an embodiment of this invention.

With reference to FIG. 1, an electronic apparatus 100 in an embodiment of this invention includes a radio communication unit 101, an audio processor 102, an output unit 103, an interface 104 for connection with an external device, an input reception unit 105, a ROM (read only memory) 106, a RAM (random access memory) 107, a controller 108, and a power supply 109 which are connected via lines including a bus. The electronic apparatus 100 may be a smartphone, a tablet-type terminal device with a touch panel, or a personal computer with a touch panel.

A microphone 123 converts incoming sounds into a corresponding analog audio signal, and feeds the analog audio signal to the audio processor 102. An A/D (analog-to-digital) converter included in the audio processor 102 changes the analog audio signal into a corresponding digital audio signal. The radio communication unit 101 receives the digital audio signal from the A/D converter in the audio processor 102. The radio communication unit 101 modules a carrier in accordance with the received audio signal to generate a modulation-resultant radio signal containing the audio signal. The radio communication unit 101 feeds the radio signal to an antenna 121. The radio signal is radiated from the antenna 121 before reaching a communication opposite party. Accordingly, the audio signal contained in the radio signal is transmitted to the communication opposite party.

The antenna 121 catches a radio signal radiated from the communication opposite party. The caught radio signal is fed from the antenna 121 to the radio communication unit 101. The radio communication unit 101 subjects the radio signal to demodulation, thereby recovering a digital audio signal from the radio signal. The audio processor 102 receives the recovered digital audio signal from the radio communication unit 101. A D/A (digital-to-analog) converter included in the audio processor 102 changes the digital audio signal to a corresponding analog audio signal. The D/A converter feeds the analog audio signal to a loudspeaker 122. The loudspeaker 122 converts the analog audio signal into corresponding sounds.

For example, the microphone 123 converts speech uttered by a user of the electronic apparatus 100 into a corresponding analog audio signal, and feeds the analog audio signal to the audio processor 102. The A/D converter in the audio processor 102 changes the analog audio signal into a corresponding digital audio signal. The audio processor 102 feeds the digital audio signal to the radio communication unit 101. As previously mentioned, the audio processor 102 receives a recovered digital audio signal from the radio communication unit 101. The D/A converter in the audio processor 102 changes the digital audio signal into a corresponding analog audio signal. The audio processor 102 feeds the analog audio signal to the loudspeaker 122.

The output unit 103 includes a video processor and a frame buffer. The video processor processes image data (data representing, for example, at least one of a still picture and a moving picture) into image information, and stores the image information into the frame buffer. The video processor may be provided in the controller 108 rather than the output unit 103. The image information is read out from the frame buffer at every predetermined sync timing such as every vertical sync timing, thereby being converted into a video signal. The output unit 103 outputs the video signal to an LCD (liquid crystal display) 124. A picture or pictures represented by the video signal are indicated on the LCD 124. A touch panel 126 is superposed on a display surface of the LCD 124.

The touch panel 126 includes an array of touch sensors used for detecting whether or not a touch (or touches) occurs, and detecting the position of a touch (or the positions of touches). The combination of the LCD 124 and the touch panel 126 is referred to as the touch screen.

An external memory 125 such as a removable IC card or a removable flash memory card can be connected with and disconnected from the interface 104. Data and information can be transferred between the external memory 125 and the interface 104 when they are connected. For example, information peculiar to the electronic apparatus 100 which represents a subscriber number and a network identifier is transferred to and stored into the external memory 125. The information peculiar to the electronic apparatus 100 may be stored in a rewritable storage area such as a flash memory area within the RAM 107.

Preferably, the interface 104 includes a USB (Universal Serial Bus) interface for USB connection with an external device. Data can be transferred between the interface 104 and the external device via the USB connection. The interface 104 may further include an interface for connection with another external device.

The input reception unit 105 receives an operation signal from the touch panel 126 which reflects operation of the touch panel 126 by the user. The input reception unit 105 generates a key code signal corresponding to the received operation signal. The input reception unit 105 feeds the key code signal to the controller 108. The controller 108 detects or determines, on the basis of the key code signal, the contents of the related operation of the touch panel 126 by the user. The user can input character data and operation commands into the electronic apparatus 100 by using the touch panel 126. The operation commands includes, for example, a command to start an application software (shortened to an application), a command to quit the application, a command to make an electronic file, a command to save an electronic file, and a command to change arrangement of icons in a desktop picture.

The ROM 106 includes a nonvolatile memory prestoring an operating system (OS) for overall control of the electronic apparatus 100 and prestoring control programs (computer programs) also. Generally, the operating system and the control programs are executed by the controller 108. In other words, the controller 108 operates according to the OS and the control programs. As will be made clear later, the control programs are assigned to a selecting process, a moving process, a deleting process, a copying process, a rearranging process, and a menu indicating process, respectively.

The RAM 107 temporarily stores data and computer programs necessary for the processing by the controller 108. The RAM 107 has a storage area, a portion of which is formed by a flash memory. This portion of the storage area stores data representative of an address book used for telephone communications and mails, data representative of a call log, downloaded data, and data representative of setting values of various functions. The OS and the control programs may be transferred from the ROM 106 to the RAM 107.

The controller 108 implements overall control of the electronic apparatus 100 according to the OS and the control programs in, for example, the ROM 106 and the RAM 107. The controller 108 sends control signals and data to the units and devices 101-107, and receives response signals and data therefrom. In addition, the controller 108 functions as a clock for the current time with respect to the electronic apparatus 100.

The power supply 109 includes a battery for powering the electronic apparatus 100.

Figure 2:
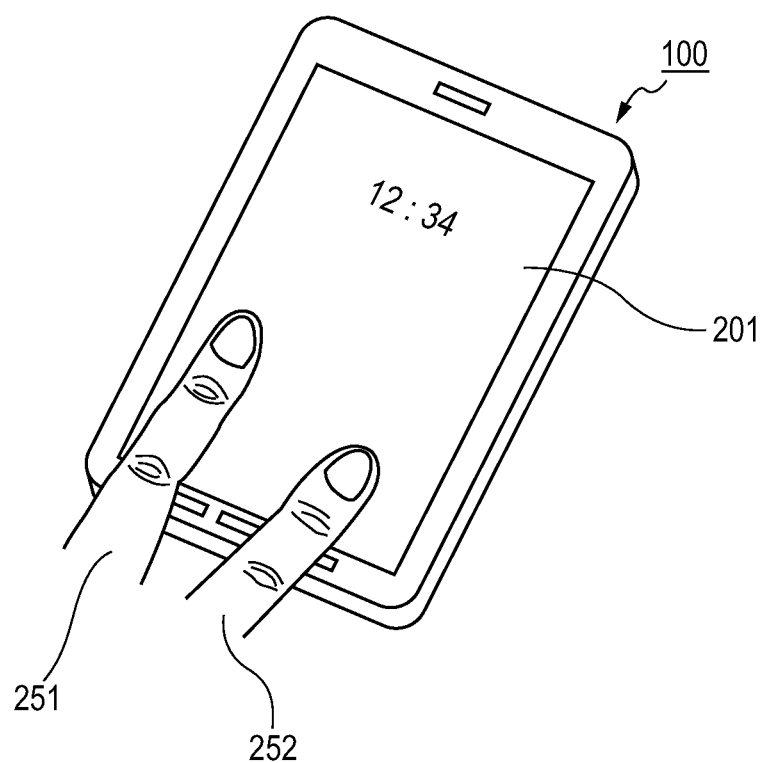
FIG. 2 is a perspective view of an example of the electronic apparatus in FIG. 1.

With reference to FIG. 2, the electronic apparatus 100 is, for example, a smartphone. The electronic apparatus 100 includes a touch screen 201 for indicating buttons and icons designed to accept commands from the user. User's action of bringing user's finger into contact with a position in the touch screen 201 where an icon (or a picture of a button) is indicated means "selecting the icon" or "touching the icon".

The electronic apparatus 100 may be a terminal apparatus which does not have the function of speech communication. In this case, the electronic apparatus 100 can be of a hardware structure from which the audio processor 102 is omitted. It should be noted that the radio communication unit 101 and the interface 104 may be omitted from the electronic apparatus 100.

FIG. 3 shows an example of a large-size picture (full-size picture) 300 indicated on the touch screen 201. The controller 108 implements the indication of the large-size picture 300 on the touch screen 201 by controlling the LCD 124 through the output unit 103 (see FIG. 1). In general, the large-size picture 300 fully covers the touch screen 201. The large-size picture 300 is, for example, a desktop picture. A two-dimensional coordinate system (an X-Y coordinate system) is defined with respect to the large-size picture 300. A position in the large-size picture 300 is expressed by a pair of coordinate values in the X-Y coordinate system. The large-size picture 300 in FIG. 3 contains five icons 310A-310E for respective commands, and small-size pictures (windows) 320A and 320B for respective applications. The user can give a desired command to the electronic apparatus 100 by selecting corresponding one from the icons 310A-310E.

The user can give a command to, for example, start an application or scroll the large-size picture 300 by brining two fingers 251 and 252 (see FIG. 2) into contact with the touch screen 201. In addition, the user can give a command to designate a partial area in the large-size picture 300, a command to move, delete, or copy an icon or icons in the designated partial area, and a command to rearrange the icons in the designated partial area by using the fingers 251 and 252 with respect to the touch screen 201.

Inputted user's command is transferred from the touch panel 126 to the controller 108 via the input reception unit 105. The LCD 124 is controlled by the controller 108 via the output unit 103 to indicate at least one of pictures and icons. While accessing the LCD 124 through the output unit 103, the controller 108 can control the indicted pictures or icons in accordance with inputted user's command. For example, the controller 108 operates to select one or more from indicated icons in accordance with first inputted user's command, and then move, delete, copy, or rearrange the selected icon or icons in accordance with second inputted user's command.

With reference to FIGS. 4(a)-4(c), 5, and 6, a description will be made below about a process of selecting, from a plurality of objects indicated on the touch screen 201, one or more in accordance with a command from the user. The objects are, for example, icons respectively. The objects may be other small-size pictures (partial-size pictures or windows) respectively. The selecting process may be implemented while being combined with another process such as a moving process as will be mentioned later.

A set of signals are fed from the touch panel 126 to the input receiving unit 105. When the user touches the touch panel 126 at one position or more positions, the set of the signals from the touch panel 126 to the input receiving unit 105 changes in accordance with the touch. The input receiving unit 105 detects the on-panel position or positions (on-screen position or positions) of the touch by referring to the set of signals from the touch panel 126. The input receiving unit 105 notifies the controller 108 of the detected touch position or positions. The input receiving unit 105 iterates detection of a touch position or positions at predetermined time intervals. While implementing the selecting process, the controller 108 repetitively acquires a touch position or positions from the input receiving unit 105 on a background operation basis.

FIG. 6 is a flowchart of a control program (computer program) for the selecting process. In the first step S601 of the program, the controller 108 decides whether or not two different positions on the touch screen 201 are touched by the user.

Generally, the user touches the touch screen 201 with user's finger or fingers. A plurality of touch sensors in the touch screen 201 respond to a touch with one finger. Accordingly, coordinate values indicating plural touch positions are acquired per finger. In the case where plural touch positions are acquired, the controller 108 analyzes a distribution of the touch positions to find a set or sets each of such adjacent touch positions that they are spaced at a prescribed distance or shorter. The controller 108 regards the found set or each of the found sets as a touch position corresponding to one finger. The controller 108 counts such sets. When two sets of adjacent touch positions are present simultaneously, the controller 108 decides that two fingers touch two different positions on the touch screen 201 respectively. The controller 108 calculates the center of gravity with respect to touch positions in each set, and labels the calculated center of gravity as one touch position corresponding to one finger and given by the user. Thus, the calculated center of gravity is referred to as a touch position which corresponds to one finger.

FIG. 4($a$) shows an example of the large-size picture 300 in which two different touch positions 401 and 402 each corresponding to one finger are present. Thus, in this case, two different positions on the touch screen 201 are touched by the user. In the step S601, the controller 108 may decide whether or not two touch positions 401 and 402 are acquired.

When three or more different touch positions each corresponding to one finger are detected, the controller 108 handles only the first and second detected touch positions as effective ones. Alternatively, the controller 108 may handle the last detected touch position and the second last detected touch position as effective ones.

When it is decided in the step S601 that two different positions on the touch screen 201 are touched (that is, when two touch positions each corresponding to one finger are acquired), the program advances from the step S601 to a step S602. Otherwise, the step S601 is repeated. Thus, the controller 108 waits until two different positions on the touch screen 201 are touched.

In the step S602, the controller 108 decides whether or not the two touch positions approach each other in accordance with the lapse of time. More detailed operation of the controller 108 in the step S602 is as follows.

Figure 5:
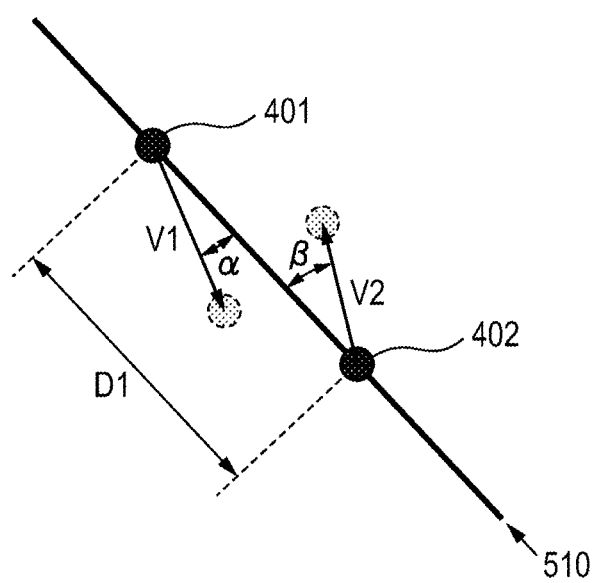
FIG. 5 is a diagram of touch positions, a straight line, and vectors in connection with the selecting process.

With reference to FIG. 5, the controller 108 calculates vectors V1 and V2 for the two touch positions 401 and 402 respectively. The vector V1 represents a movement or variation of the touch position 401 per unit time. The vector V2 represents a movement or variation of the touch position 401 per unit time.

The controller 108 compares the lengths of the vectors V1 and V2 with a prescribed length. When both the lengths of the vectors V1 and V2 are smaller than the prescribed length, that is, when the variations of the touch positions 401 and 402 are relatively small, the controller 108 derives a straight line 510 passing through the touch positions 401 and 402. Typically, the straight line 510 is one occurring at an initial stage of the touch on the touch screen 201 with two fingers.

Furthermore, the controller 108 calculates the angle "α" between the straight line 510 and the vector V1, and the angle "β" between the straight line 510 and the vector V2. The controller 108 compares the angles "α" and "β" with a prescribed angle. In addition, the controller 108 calculates the distance D1 between the touch positions 401 and 402. The controller 108 decides whether or not the distance D1 decreases in accordance with the lapse of time.

In the case where both the angles "α" and "β" are smaller than the prescribed angle and the distance D1 decreases in accordance with the lapse of time, the controller 108 concludes that the two touch positions 401 and 402 approach each other in accordance with the lapse of time. Otherwise, the controller 108 concludes that the two touch positions 401 and 402 do not approach each other.

When it is decided in the step S602 that the two touch positions approach each other, the program advances from the step S602 to a step S603. Otherwise, the program exits from the step S602, and the current execution cycle of the program ends.

In the step S603, the controller 108 calculates the loci of the two touch positions 401 and 402. Then, the controller 108 decides whether or not the calculated loci of the two touch positions 401 and 402 are linear. Specifically, the controller 108 decides whether or not the vectors V1 and V2 in FIG. 5 are linear.

When it is decided in the step S603 that the loci of the two touch positions 401 and 402 are linear, the program advances from the step S603 to a step S604. Otherwise, the program exits from the step S603, and the current execution cycle of the program ends.

In the step S604, the controller 108 sets a rectangular area 450 as shown in FIG. 4($c$). The positions of two opposite corners of the rectangular area 450 are equal to the touch positions 401 and 402 occurring when both the lengths of the vectors V1 and V2 are smaller than the prescribed length. The upper and lower sides of the rectangular area 450 are parallel to the X axis in the X-Y coordinate system. The left and right sides of the rectangular area 450 are parallel to the Y axis in the X-Y coordinate system.

The rectangular area 450 is a square or a non-square rectangle. Typically, the rectangular area 450 has two opposite corners located at the touch positions 401 and 402 which occur at an initial stage of the touch to the touch screen 201 by two fingers.

In a step S605 following the step S604, the controller 108 selects objects contained in the rectangular area 450. For example, in FIG. 4($c$), the controller 108 selects the three icons 310A, 310B, and 310C from the five icons 310A-310E. It should be noted that the icons 310A, 310B, and 310C are in the rectangular area 450. After the step S605, the current execution cycle of the program ends.

In this way, the controller 108 selects an object or objects in the large-size picture 300 on the basis of the command from the user. Thus, the user can select one or more from objects indicated on the touch screen 201 by taking a sequence of simple actions as follows. The user opens two fingers above the touch screen 201 so that a desired object or objects will be substantially between the tips of the fingers. Then, the user brings the tips of the two fingers into contact with two positions on the touch screen 201, and thereafter closes the fingers while sliding the finger tips on the touch screen 201. Thus, the two finger tips in contact with the touch screen 201 approach each other in a manner such that the desired object or objects are put between them. A rectangular area 450 is set at an initial stage of the touch to the touch screen 201. Two opposite corners of the rectangular area coincide with the positions at which user's fingers first touch the touch screen 201. An object or objects contained in the rectangular area 450 are selected. The selected object or objects are the same as the desired object or objects. Accordingly, the user can select a desired object or objects by taking simple actions which are independent of whether a single desired object or plural desired objects are present. The user can complete the selecting process by bringing the fingers out of contact with the touch screen 201. Thus, the selecting process is implemented by sequential operation starting when user's fingers touch the touch screen 201, and ending when they separate from the touch panel 201.

Figure 4A:
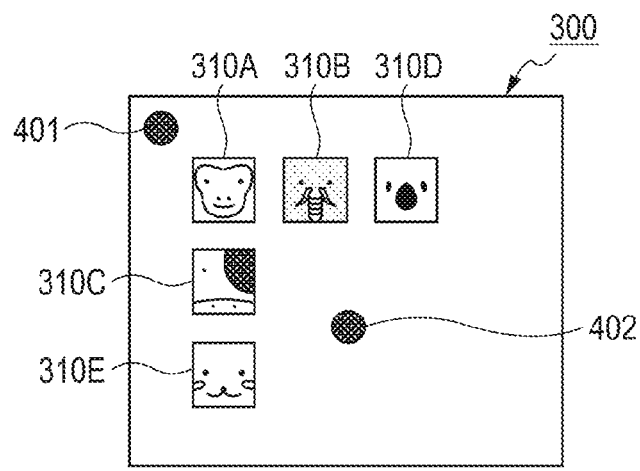
FIGS. 4(a), 4(b), and 4(c) are diagrams of examples of the large-size picture which occur during a selecting process.
Figure 4B:
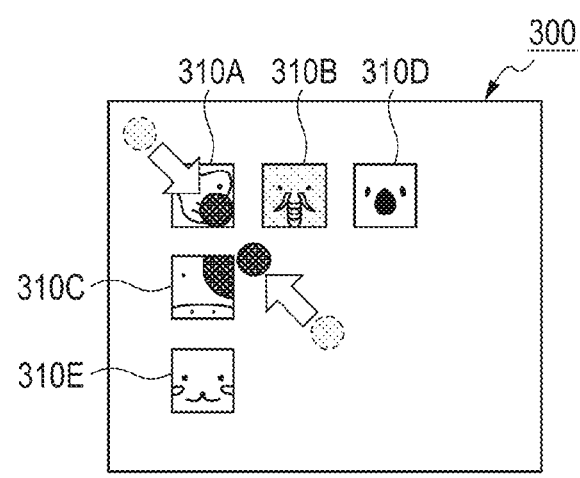
Figure 4C:
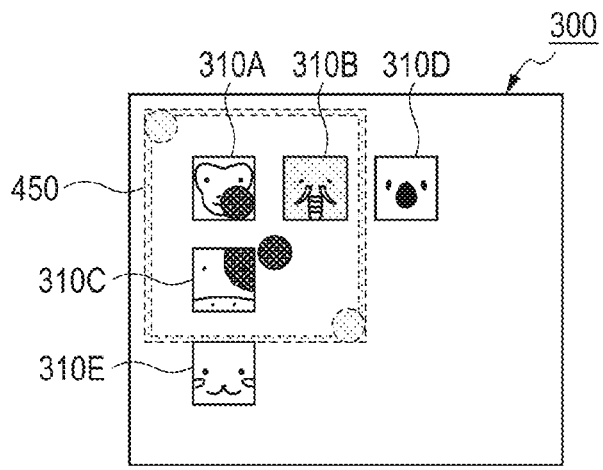

Preferably, the controller 108 operates to indicate the rectangular area 450 over the large-size picture 300 on the touch screen 201 as shown in FIG. 4(c). In this case, the rectangular area 450 is superimposed over the large-size picture 300. The controller 108 may operate to unindicate or hide the rectangular area 450.

The large-size picture 300 is changeable between a selection state where the rectangular area 450 is set (an object or objects are selected) and an unselection state where the rectangular area 450 is not set.

Generally, an object or objects selected by the user are an icon or icons. An object or objects selected by the user may be an arbitrary small-size picture or pictures. Each object may take an arbitrary shape, an arbitrary size, and an arbitrary position. The number of objects may be arbitrary.

The selecting process is applied to, for example, the selection of an icon or icons in a desktop picture. The selecting process may be used for other purposes.

The selecting process enables the following action. In the case where many objects are indicated on the touch screen 201 during the play of a computer game, the user can easily select desired ones from the indicated objects by touching two points on the touch screen 201 and then making the two touch points closer to each other even when it is relatively difficult for the user to accurately grasp the number of the desired objects and the positions of the desired objects.

The selecting process may be used in a data editing application such as a text editor or an image editor. In this case, there is provided the following advantage. The user can easily select a desired character or characters, a desired character sequence, or a desired portion of an image by touching two points on the touch screen 201 and then making the two touch points closer to each other.

With reference to FIGS. 7(a)-7(d), 8, and 9, a description will be made below about a process of moving selected one or ones among objects indicated on the touch screen 201 in accordance with a command from the user. The moving process follows the selecting process. While implementing the moving process, the controller 108 repetitively acquires a touch position or positions from the input receiving unit 105 on a background operation basis.

Figure 7A:
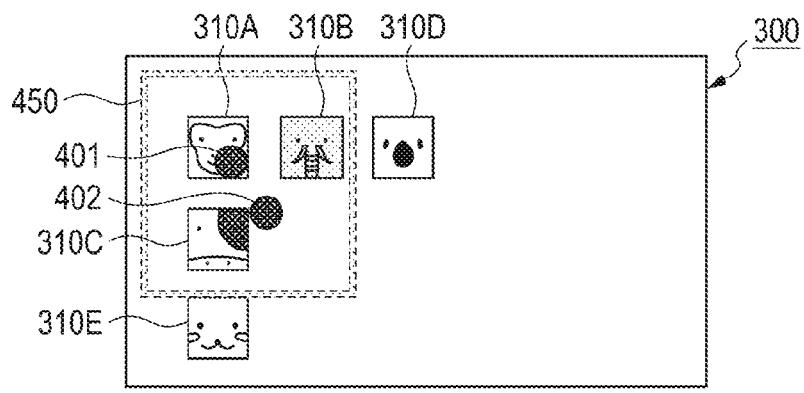
FIGS. 7(a), 7(b), 7(c), and 7(d) are diagrams of examples of the large-size picture which occur during a moving process.
Figure 9:
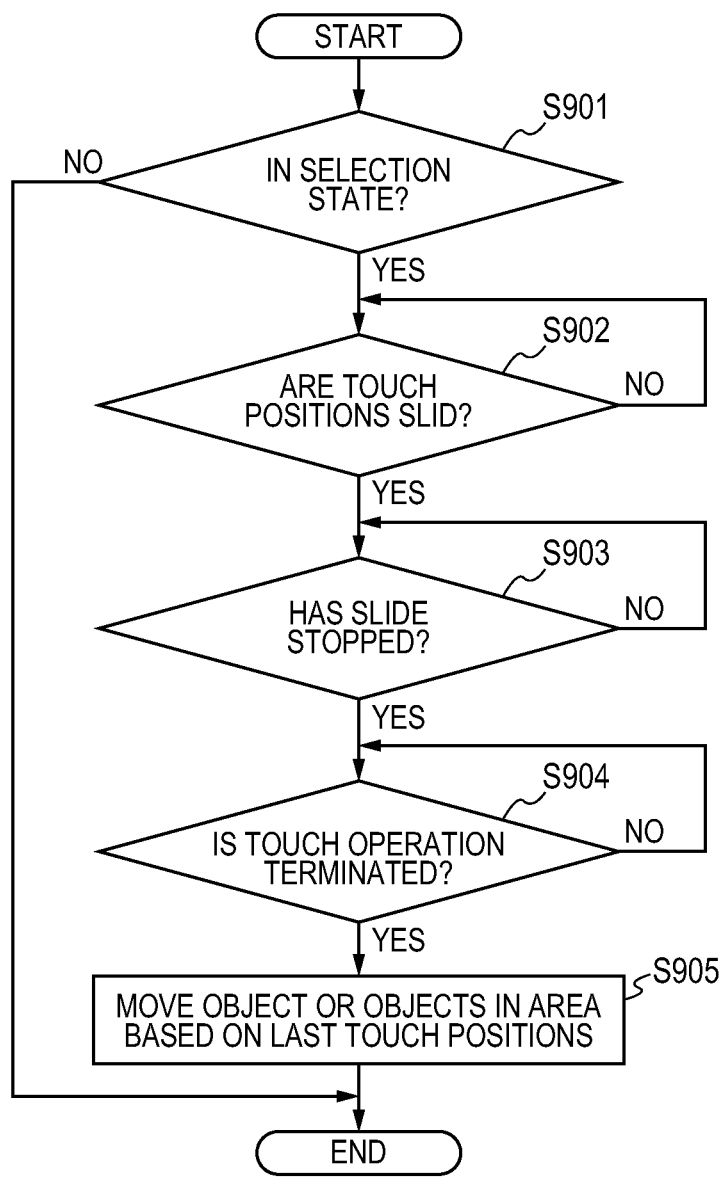
FIG. 9 is a flowchart of a computer program for the moving process.

FIG. 9 is a flowchart of a control program (computer program) for the moving process. In the first step S901 of the program, the controller 108 decides whether or not a large-size picture 300 is in its selection state. FIG. 7(a) shows an example of the large-size picture 300 in its selection state. In FIG. 7(a), a rectangular area 450 is set in the large-size picture 300, and icons 310A, 310B, and 310C are contained in the rectangular area 450. Thus, the icons 310A, 310B, and 310C are selected by the user.

When it is decided in the step S901 that the large-size picture 300 is in its selection state, the program advances from the step S901 to a step S902. Otherwise, the program exits from the step S901, and then the current execution cycle of the program ends.

Figure 7B:
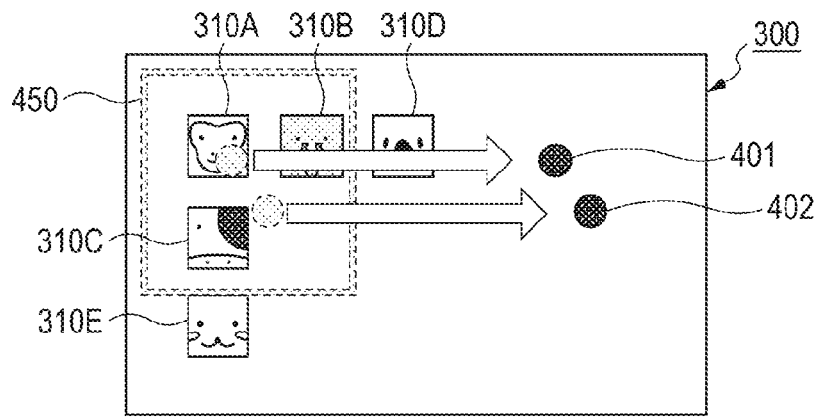

In the step S902, the controller 108 decides whether or not two touch positions 401 and 402 are slid on an approximately translation basis (see FIG. 7(b)). Specifically, the controller 108 repetitively detects the spatial relation between the touch positions 401 and 402. In the case where the spatial relation between the touch positions 401 and 402 is substantially constant while the touch positions 401 and 402 are varied or shifted relative to the large-size picture 300, the controller 108 decides that the touch positions 401 and 402 are slid on an approximately translation basis. Otherwise, the controller 108 decides that the touch positions 401 and 402 are not slid on an approximately translation basis. Preferably, the controller 108 decides whether or not the touch positions 401 and 402 are slid in substantially a same direction. In the case where the spatial relation between the touch positions 401 and 402 is substantially constant while the touch positions 401 and 402 are slid in a same direction, the controller 108 decides that the touch positions 401 and 402 are slid on an approximately translation basis. Otherwise, the controller 108 decides that the touch positions 401 and 402 are not slid on an approximately translation basis. More detailed operation of the controller 108 in the step S902 is as follows.

Figure 8:
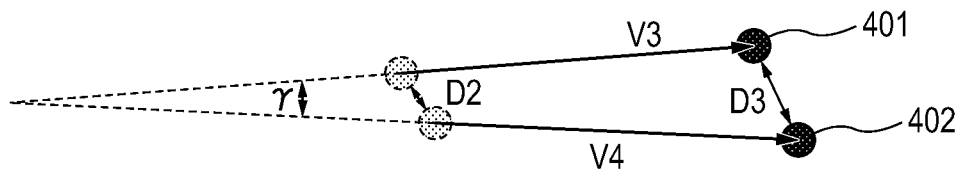
FIG. 8 is a diagram of touch positions and vectors in connection with the moving process.

With reference to FIG. 8, the controller 108 derives vectors V3 and V4. The vector V3 starts from the touch position 401 occurring at a first moment, and ends at the touch position 401 occurring at a second moment after the first moment. The vector V4 starts from the touch position 402 occurring at the first moment, and ends at the touch position 402 occurring at the second moment. In addition, the controller 108 calculates the distance D2 between the touch positions 401 and 402 at the first moment, and calculates the distance D3 therebetween at the second moment.

The controller 108 calculates an angle "γ" between the vectors V3 and V4. The controller 108 compares the angle "γ" with a prescribed angle. The controller 108 calculates a variation (difference) between the distances D2 and D3. The controller 108 compares the calculated variation with a prescribed allowable range. In the case where the angle "γ" is equal to or smaller than the prescribed angle while the variation is in the prescribed allowable range, the controller 108 decides that the touch positions 401 and 402 are slid on an approximately translation basis. Otherwise, the controller 108 decides that the touch positions 401 and 402 are not slid on an approximately translation basis.

When it is decided in the step S902 that the touch positions 401 and 402 are slid on an approximately translation basis, the program advances from the step S902 to a step S903. Otherwise, the step S902 is repeated.

Thus, the controller 108 waits until the touch positions 401 and 402 are slid on an approximately translation basis.

In the step S903, the controller 108 decides whether or not the touch positions 401 and 402 stop being slid, that is, whether or not they continue to be slid. When it is decided that the touch positions 401 and 402 stop being slid, that is, when it is decided that they do not continue to be slid, the program advances from the step S903 to a step S904. Otherwise, the step S903 is repeated. Thus, the controller 108 waits until the touch positions 401 and 402 stop being slid.

In the step S904, the controller 108 decides whether or not user's operation of touching the touch screen 201 is terminated, that is, whether or not user's fingers separate from the touch screen 201. When it is decided that user's operation of touching the touch screen 201 is terminated, that is, when it is decided that user's fingers separate from the touch screen 201, the program advances from the step S904 to a step S905. Otherwise, the step S904 is repeated. Thus, the controller 108 waits until user's operation of touching the touch screen 201 is terminated.

In the step S905, the controller 108 moves the objects in the rectangular area 450 on the basis of the last touch positions 401 and 402 (the touch positions 401 and 402 occurring at the moment of separation of user's fingers from the touch screen 201). After the step S905, the current execution cycle of the program ends. More detailed operation of the controller 108 in the step S905 is as follows.

Figure 7C:
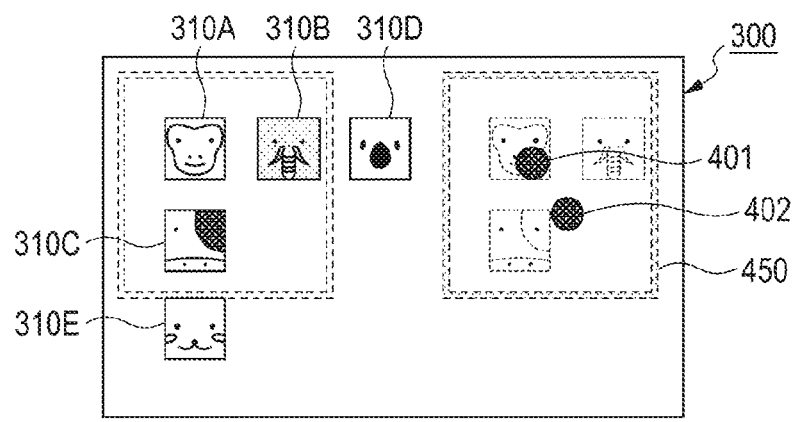
Figure 7D:
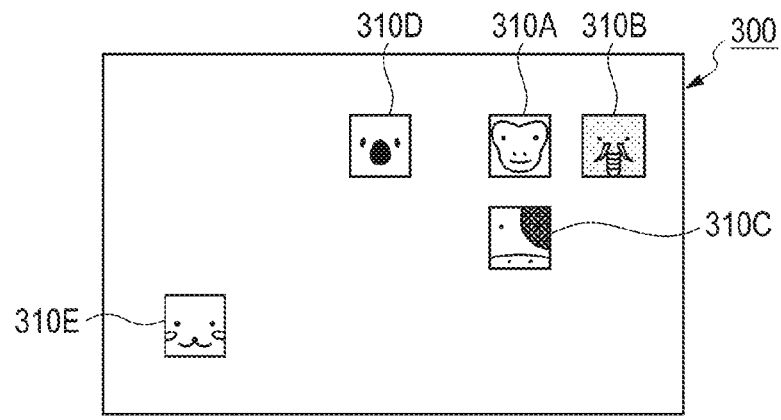

With reference to FIGS. 7(a)-7(c), the controller 108 moves a set of the rectangular area 450 and the icons 310A, 310B, and 310C therein from an initial place to a final place. The initial place corresponds to the initial touch positions 401 and 402, and occurs immediately before the touch positions 401 and 402 start being slid. The final place corresponds to the last touch positions 401 and 402, and occurs when the slide of the touch positions 401 and 402 is completed. The controller 108 equalizes the spatial relation among the rectangular area 450, the icons 310A, 310B, and 310C, and the touch positions 401 and 402 for the above-mentioned initial place to that for the above-mentioned final place. Specifically, as shown in FIG. 7(d), the controller 108 deletes the icons 310A, 310B, and 310C in the rectangular area 450 occurring immediately before the touch positions 401 and 402 start being slid. Then, the controller 108 newly generates indicated icons 310A, 310B, and 310C at locations near the last touch positions 401 and 402. Accordingly, the user can move desired one or ones among objects indicated on the touch screen 201 by taking a sequence of simple actions as follows. The user selects desired object or objects and then slides user's fingers on the touch screen 201 to a destination without separating them from the touch screen 201.

In general, the controller 108 moves the selected icons 310A, 310B, and 310C in a direction substantially equal to the direction along which the touch positions 401 and 402 have been slid.

With reference to FIGS. 10(a)-10(c), 11(a)-11(c), and 12, a description will be made below about a process of deleting selected one or ones among objects indicated on the touch screen 201 in accordance with a command from the user. The deleting process follows the selecting process. While implementing the deleting process, the controller 108 repetitively acquires a touch position or positions from the input receiving unit 105 on a background operation basis.

Figure 10A:
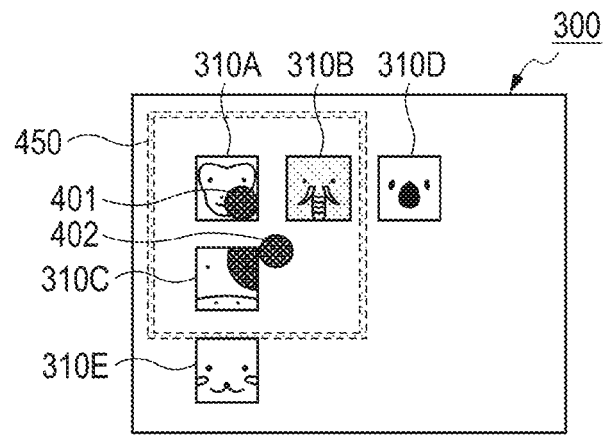
FIGS. 10(a), 10(b), and 10(c) are diagrams of examples of the large-size picture which occur during a deleting process.
Figure 12:
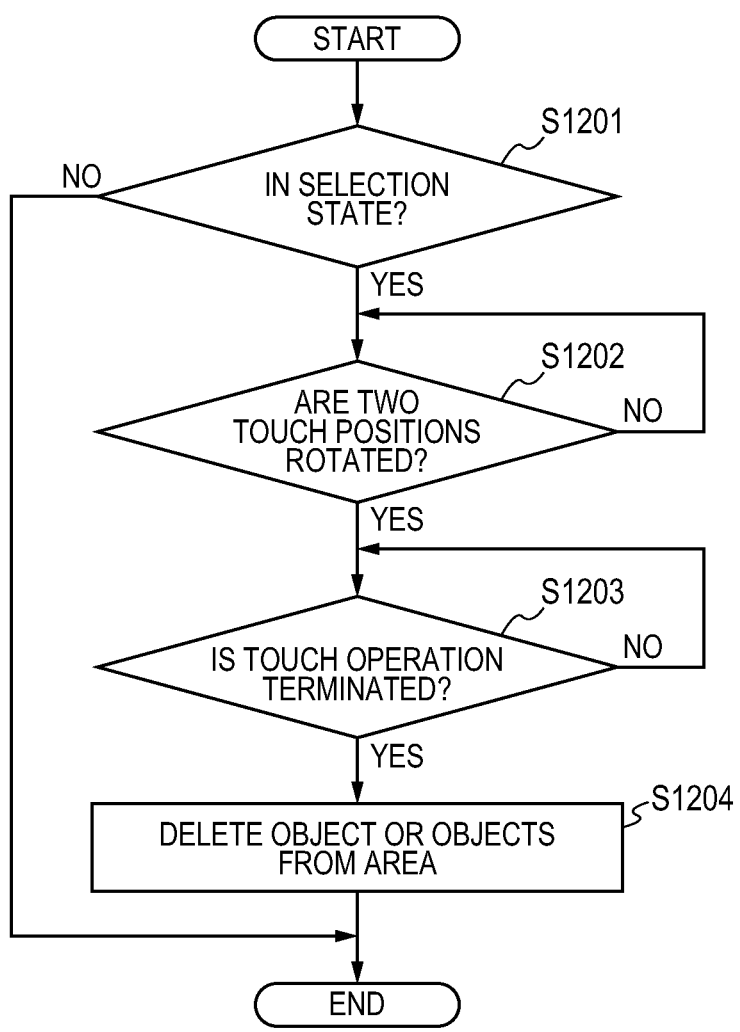
FIG. 12 is a flowchart of a computer program for the deleting process.

FIG. 12 is a flowchart of a control program (computer program) for the deleting process. In the first step S1201 of the program, the controller 108 decides whether or not a large-size picture 300 is in its selection state. FIG. 10(a) shows an example of the large-size picture 300 in its selection state. In FIG. 10(a), a rectangular area 450 is set in the large-size picture 300, and icons 310A, 310B, and 310C are contained in the rectangular area 450. Thus, the icons 310A, 310B, and 310C are selected by the user.

When it is decided in the step S1201 that the large-size picture 300 is in its selection state, the program advances from the step S1201 to a step S1202. Otherwise, the program exits from the step S1201, and then the current execution cycle of the program ends.

Figure 10B:
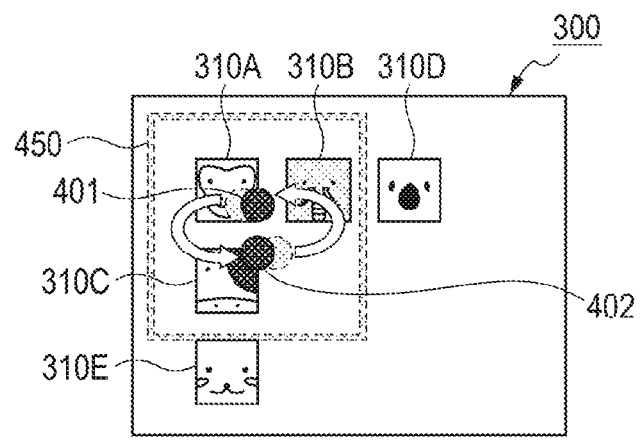
Figure 10C:
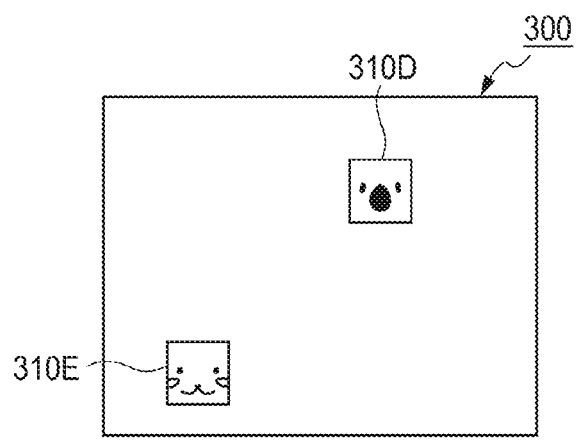

In the step S1202, the controller 108 decides whether or not two touch positions 401 and 402 are rotated (see FIG. 10(b)). In the case where both the touch positions 401 and 402 are substantially rotated along arcs of a circle at equal angular velocities respectively while the center of gravity between the touch positions 401 and 402 substantially remains stationary, the controller 108 decides that the touch positions 401 and 402 are rotated. Otherwise, the controller 108 decides that the touch positions 401 and 402 are not rotated. More detailed operation of the controller 108 in the step S1202 is as follows.

Figure 11A:
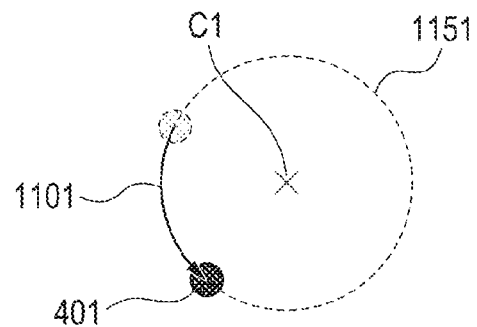
FIGS. 11(a), 11(b), and 11(c) are diagrams of touch positions and circles in connection with the deleting process.
Figure 11B:
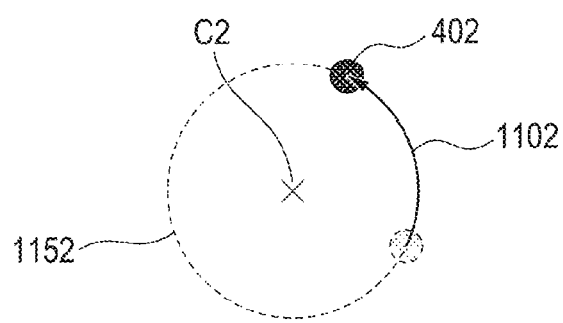
Figure 11C:
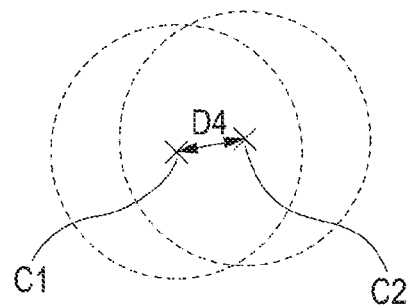

With reference to FIG. 11(a), the controller 108 calculates the locus 1101 of the touch position 401 which occurs during a prescribed time interval. The controller 108 carries out a least squares method and thereby derives a circle 1151 approximate to the locus 1101 of the touch position 401. With reference to FIG. 11(b), the controller 108 calculates the locus 1102 of the touch position 402 which occurs during the prescribed time interval. The controller 108 carries out a least squares method and thereby derives a circle 1152 approximate to the locus 1102 of the touch position 402.

The controller 108 detects or locates the center C1 of the circle 1151 and the center C2 of the circle 1152. The controller 108 calculates the distance between the centers C1 and C2. The controller 108 compares the calculated distance with a prescribed value.

Furthermore, the controller 108 detects the direction of rotation of the touch position 401 and that of the touch position 402. The controller 108 determines whether or not the directions of rotation of the touch positions 401 and 402 are the same.

In the case where the calculated distance between the centers C1 and C2 is equal to or smaller than the prescribed value while the directions of rotation of the touch positions 401 and 402 are the same, the controller 108 decides that the touch positions 401 and 402 are rotated. Otherwise, the controller 108 decides that the touch positions 401 and 402 are not rotated.

The controller 108 may derive ellipses approximate to the loci 1101 and 1102 of the touch positions 401 and 402 instead of the circles. In this case, the controller 108 uses the derived ellipses in deciding whether or not the touch positions 401 and 402 are rotated.

When it is decided in the step S1202 that the touch positions 401 and 402 are rotated, the program advances from the step S1202 to a step S1203. Otherwise, the step S1202 is repeated. Thus, the controller 108 waits until the touch positions 401 and 402 are rotated.

In the step S1203, the controller 108 decides whether or not user's operation of touching the touch screen 201 is terminated, that is, whether or not user's fingers separate from the touch screen 201. When it is decided that user's operation of touching the touch screen 201 is terminated, that is, when it is decided that user's fingers separate from the touch screen 201, the program advances from the step S1203 to a step S1204. Otherwise, the step S1203 is repeated. Thus, the controller 108 waits until user's operation of touching the touch screen 201 is terminated.

In the step S1204, the controller 108 deletes all the objects in the rectangular area 450 from the large-size picture 300. After the step S1204, the current execution cycle of the program ends. For example, with reference to FIGS. 10(b) and 10(c), the controller 108 deletes the icons 310A, 310B, and 310C in the rectangular area 450 from the large-size picture 300. On the other hand, the controller 108 holds the icons 310D and 310E outside the rectangular area 450 as they are. Accordingly, the user can delete desired one or ones among objects indicated on the touch screen 201 by taking a sequence of simple actions as follows. The user selects desired object or objects and then slides and rotates user's fingers on the touch screen 201 without separating them from the touch screen 201.

With reference to FIGS. 13(a)-13(c), 14, and 15, a description will be made below about a process of copying selected one or ones among objects indicated on the touch screen 201 in accordance with a command from the user. The copying process follows the selecting process. While implementing the copying process, the controller 108 repetitively acquires a touch position or positions from the input receiving unit 105 on a background operation basis.

Figure 15:
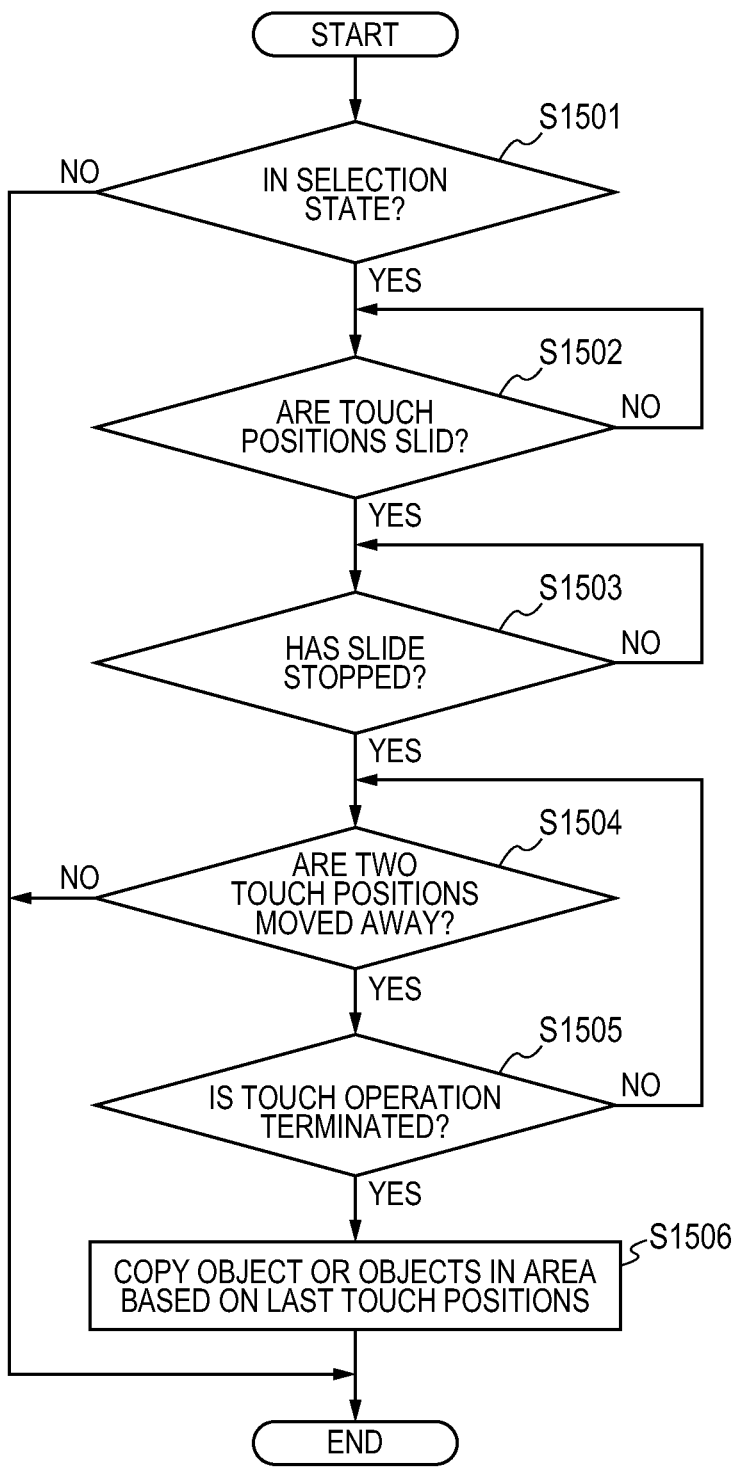
FIG. 15 is a flowchart of a computer program for the copying process.

FIG. 15 is a flowchart of a control program (computer program) for the copying process. In the first step S1501 of the program, the controller 108 decides whether or not a large-size picture 300 is in its selection state. FIG. 13(a) shows an example of the large-size picture 300 in its selection state. In FIG. 13(a), a rectangular area 450 is set in the large-size picture 300, and icons 310A, 310B, and 310C are contained in the rectangular area 450. Thus, the icons 310A, 310B, and 310C are selected by the user.

When it is decided in the step S1501 that the large-size picture 300 is in its selection state, the program advances from the step S1501 to a step S1502. Otherwise, the program exits from the step S1501, and then the current execution cycle of the program ends.

In the step S1502, the controller 108 decides whether or not two touch positions 401 and 402 are slid on an approximately translation basis (see FIG. 13(b)). Operation of the controller 108 in the step S1502 is the same as that in the step S902 for the moving process. In the case where the spatial relation between the touch positions 401 and 402 is substantially constant while the touch positions 401 and 402 vary or shift relative to the large-size picture 300, the controller 108 decides that the touch positions 401 and 402 are slid on an approximately translation basis. Otherwise, the controller 108 decides that the touch positions 401 and 402 are not slid on an approximately translation basis. When it is decided in the step S1502 that the touch positions 401 and 402 are slid on an approximately translation basis, the program advances from the step S1502 to a step S1503. Otherwise, the step S1502 is repeated. Thus, the controller 108 waits until the touch positions 401 and 402 are slid on an approximately translation basis.

In the step S1503, the controller 108 decides whether or not the touch positions 401 and 402 stop being slid, that is, whether or not they continue to be slid. When it is decided that the touch positions 401 and 402 stop being slid, that is, when it is decided that they do not continue to be slid, the program advances from the step S1503 to a step S1504. Otherwise, the step S1503 is repeated. Thus, the controller 108 waits until the touch positions 401 and 402 stop being slid.

The step S1504 relates to movements of the touch positions 401 and 402 which occur after they have stopped being slid once. In the step S1504, the controller 108 decides whether or not the touch positions 401 and 402 are moved away from each other in accordance with the lapse of time. More detailed operation of the controller 108 in the step S1504 is as follows.

Figure 14:
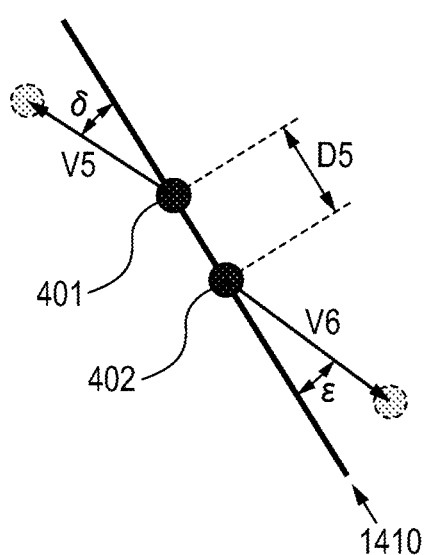
FIG. 14 is a diagram of touch positions, a straight line, and vectors in connection with the copying process.

With reference to FIG. 14, the controller 108 derives vectors V5 and V6. The vector V5 represents a variation or a movement of the touch position 401 per unit time. The vector V6 represents a variation or a movement of the touch position 402 per unit time.

Furthermore, the controller 108 derives a straight line 1410 passing through the touch positions 401 and 402 occurring when they stop being slid. Then, the controller 108 calculates an angle "δ" between the vector V5 and the straight line 1410, and an angle "ϵ" between the vector V6 and the straight line 1410.

In addition, the controller 108 compares the calculated angles "δ" and "ϵ" with a prescribed angle. The controller 108 calculates the distance D5 between the touch positions 401 and 402. The controller 108 determines whether or not the calculated distance D5 increases in accordance with the lapse of time. In the case where both the calculated angles "δ" and "ϵ" are smaller than the prescribed angle while the calculated distance D5 increases in accordance with the lapse of time, the controller 108 decides that the touch positions 401 and 402 are moved away from each other in accordance with the lapse of time. Otherwise, the controller D5 decides that the touch positions 401 and 402 are not moved away from each other.

When it is decided in the step S1504 that the touch positions 401 and 402 are moved away from each other, the program advances from the step S1504 to a step S1505. Otherwise, the program exits from the step S1504, and then the current execution cycle of the program ends.

In the step S1505, the controller 108 decides whether or not user's operation of touching the touch screen 201 is terminated, that is, whether or not user's fingers separate from the touch screen 201. When it is decided that user's operation of touching the touch screen 201 is terminated, that is, when it is decided that user's fingers separate from the touch screen 201, the program advances from the step S1505 to a step S1506. Otherwise, the program returns from the step S1505 to the step S1504.

In the step S1506, the controller 108 copies the selected objects (the objects in the rectangular area 450 within the large-size picture 300 in its selection state) and places the copy-resultant objects at locations determined by the last touch positions 401 and 402. Preferably, these locations are near the last touch positions 401 and 402. After the step S1506, the current execution cycle of the program ends. More detailed operation of the controller 108 in the step S1506 is as follows.

With reference to FIGS. 13(a)-13(c), in the case where the touch positions 401 and 402 are moved away from each other after they have stopped being slid once, when user's operation of touching the touch screen 201 is terminated, the controller 108 generates icons 1310A, 1310B, and 1310C equal in contents to the selected icons 310A, 310B, and 310C in the rectangular area 450 respectively. In other words, the controller 108 copies the selected icons 310A, 310B, and 310C to generate the copy-resultant icons 1310A, 1310B, and 1310C. The controller 108 places the copy-resultant icons 1310A, 1310B, and 1310C in accordance with the last touch positions 401 and 402. Thus, the locations of the copy-resultant icons 1310A, 1310B, and 1310C are determined by the last touch positions 401 and 402. Preferably, the locations of the copy-resultant icons 1310A, 1310B, and 1310C are near the last touch positions 401 and 402. Accordingly, the user can copy desired one or ones among objects indicated on the touch screen 201 by taking a sequence of simple actions as follows. The user selects desired object or objects and then slides user's fingers on the touch screen 201. Thereafter, the user stops the slide of user's fingers and then moves user's fingers away from each other on the touch screen 201 without separating them from the touch screen 201.

With reference to FIGS. 16(a)-16(c), 17(a), 17(b), and 18, a description will be made below about a process of rearranging selected ones among objects indicated on the touch screen 201 in accordance with a command from the user. The rearranging process follows the selecting process. While implementing the rearranging process, the controller 108 repetitively acquires a touch position or positions from the input receiving unit 105 on a background operation basis.

Figure 16A:
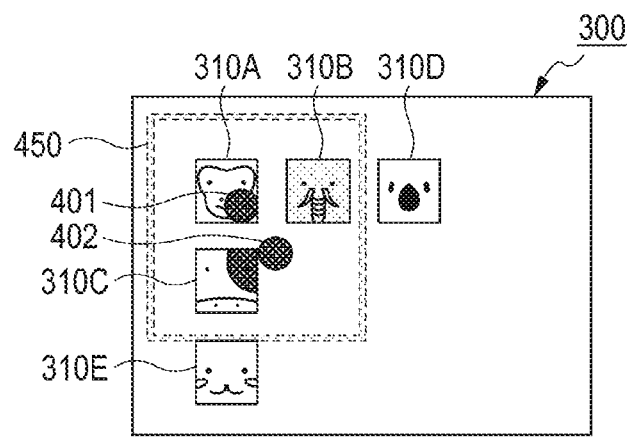
FIGS. 16(a), 16(b), and 16(c) are diagrams of examples of the large-size picture which occur during a rearranging process.
Figure 18:
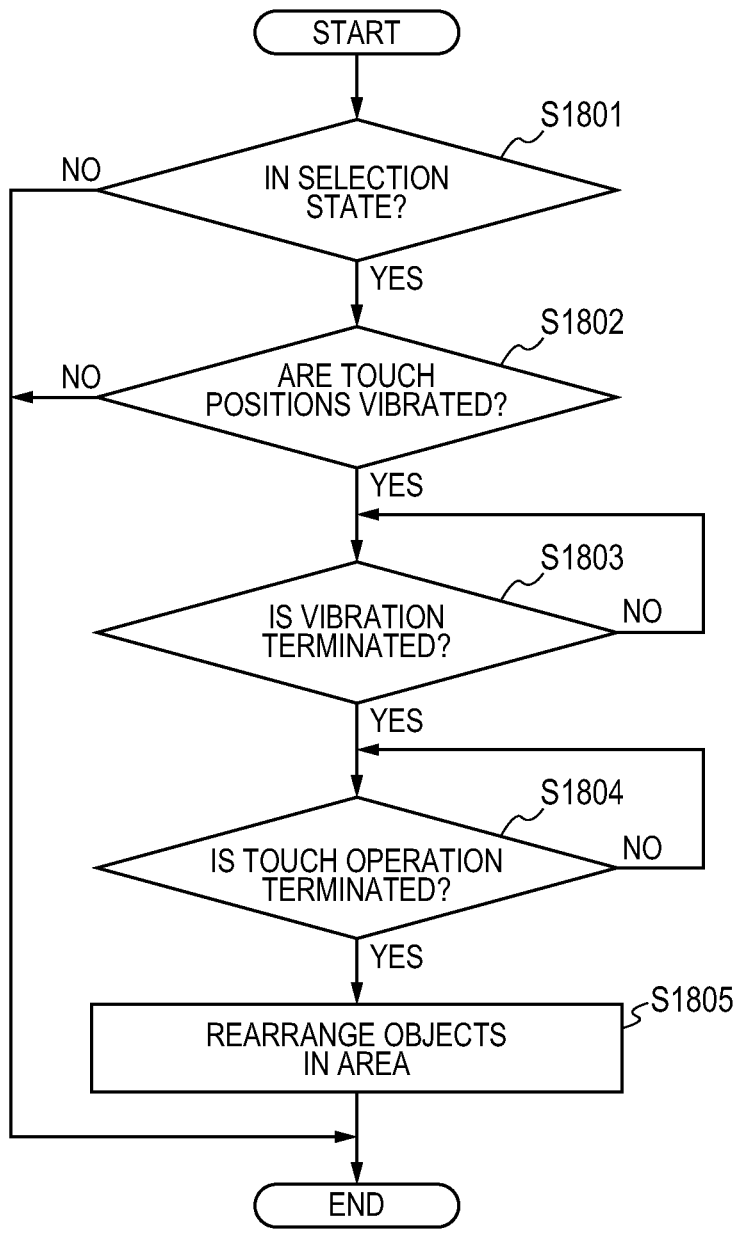
FIG. 18 is a flowchart of a computer program for the rearranging process.

FIG. 18 is a flowchart of a control program (computer program) for the rearranging process. In the first step S1801 of the program, the controller 108 decides whether or not a large-size picture 300 is in its selection state. FIG. 16(a) shows an example of the large-size picture 300 in its selection state. In FIG. 16(a), a rectangular area 450 is set in the large-size picture 300, and icons 310A, 310B, and 310C are contained in the rectangular area 450. Thus, the icons 310A, 310B, and 310C are selected by the user.

When it is decided in the step S1801 that the large-size picture 300 is in its selection state, the program advances from the step S1801 to a step S1802. Otherwise, the program exits from the step S1801, and then the current execution cycle of the program ends.

Figure 16B:
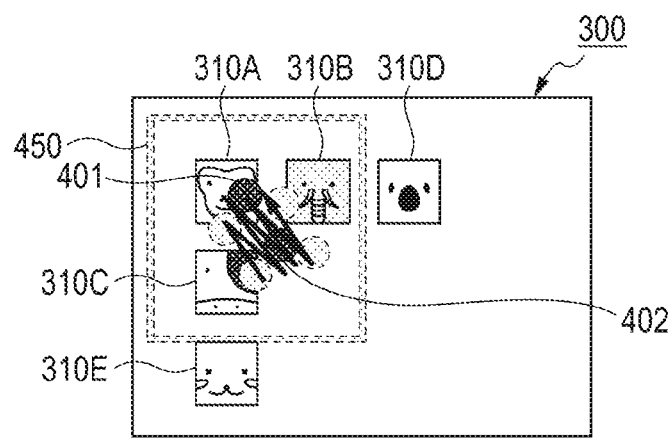
Figure 16C:
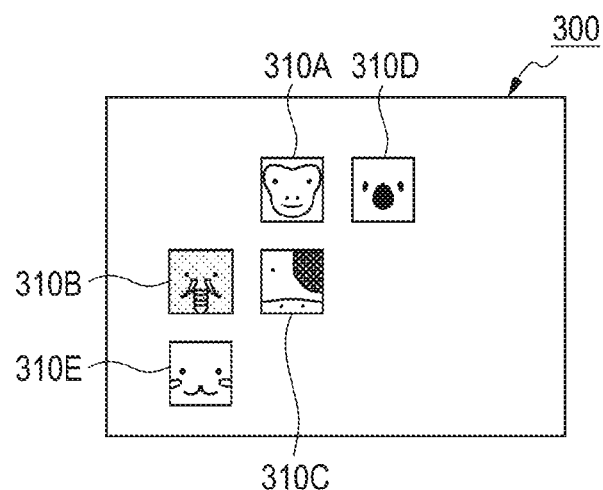

In the step S1802, the controller 108 decides whether or not two touch positions 401 and 402 are vibrated (see FIG. 16(b)). In the case where the spatial relation between the touch positions 401 and 402 is substantially constant while the touch positions 401 and 402 are reciprocated for relatively short strokes, the controller 108 decides that the touch positions 401 and 402 are vibrated. Otherwise, the controller 108 decides that the touch positions 401 and 402 are not vibrated. More detailed operation of the controller 108 in the step S1802 is as follows.

Figure 17A:
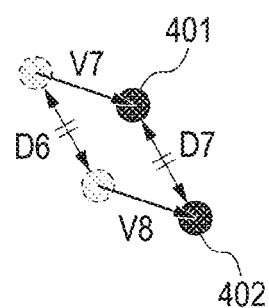
FIGS. 17(a) and 17(b) are diagrams of touch positions and vectors in connection with the rearranging process.

With reference to FIG. 17(a), the controller 108 derives vectors V7 and V8. The vector V7 starts from the touch position 401 occurring at a first moment, and ends at the touch position 401 occurring at a second moment one-unit-time after the first moment. Thus, the vector V7 represents a variation or movement of the touch position 401 per unit time. The vector V8 starts from the touch position 402 occurring at the first moment, and ends at the touch position 402 occurring at the second moment. Thus, the vector V8 represents a variation or movement of the touch position 402 per unit time. The controller 108 detects every direction reverse of movement of each of the touch positions 401 and 402.

Figure 17B:
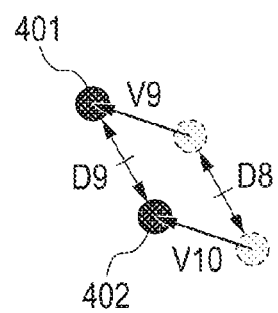

With reference to FIG. 17(b), the controller 108 derives vectors V9 and V10. The vector V9 starts from the touch position 401 occurring at a third moment, and ends at the touch position 401 occurring at a fourth moment one-unit-time after the third moment. Thus, the vector V9 represents a variation or movement of the touch position 401 per unit time. The third moment follows the second moment and occurs after the directions of movement of the touch positions 401 and 402 are reversed. The vector V10 starts from the touch position 402 occurring at the third moment, and ends at the touch position 402 occurring at the fourth moment. Thus, the vector V10 represents a variation or movement of the touch position 402 per unit time.

The controller 108 calculates the distances D6, D7, D8, and D9 between the touch positions 401 and 402 at the first, second, third, and fourth moments, respectively.

The controller 108 determines whether or not the vectors V7 and V8 are substantially equal in length and direction. The controller 108 determines whether or not the calculated distances D6 and D7 are substantially equal. The controller 108 determines whether or not the vectors V9 and V10 are substantially equal in length and direction. The controller 108 determines whether or not the calculated distances D8 and D9 are substantially equal. The controller 108 determines whether or not the directions of the vectors V7 and V8 are substantially opposite to those of the vectors V9 and V10. The controller 108 decides that the touch positions 401 and 402 are vibrated in the case where (1) the vectors V7 and V8 are substantially equal in length and direction; (2) the calculated distances D6 and D7 are substantially equal; (3) the vectors V9 and V10 are substantially equal in length and direction; (4) the calculated distances D8 and D9 are substantially equal; and (5) the directions of the vectors V7 and V8 are substantially opposite to those of the vectors V9 and V10. Otherwise, the controller 108 decides that the touch positions 401 and 402 are not vibrated.

When it is decided in the step S1802 that the touch positions 401 and 402 are vibrated, the program advances from the step S1802 to a step S1803. Otherwise, the program exits from the step S1802, and then the current execution cycle of the program ends.

In the step S1803, the controller 108 decides whether or not the vibration of the touch positions 401 and 402 is terminated. When it is decided that the vibration is terminated, the program advances from the step S1803 to a step S1804. Otherwise, the step S1803 is repeated. Thus, the controller 108 waits until the vibration is terminated.

In the step S1804, the controller 108 decides whether or not user's operation of touching the touch screen 201 is terminated, that is, whether or not user's fingers separate from the touch screen 201. When it is decided that user's operation of touching the touch screen 201 is terminated, that is, when it is decided that user's fingers separate from the touch screen 201, the program advances from the step S1804 to a step S1805. Otherwise, the step S1804 is repeated. Thus, the controller 108 waits until user's operation of touching the touch screen 201 is terminated.

In the step S1805, the controller 108 rearranges the objects in the rectangular area 450. Tom implement rearrangement, the controller 108 may change the order in which the objects in the rectangular area 450 are arranged. When three or more objects (icons) are contained in the rectangular area 450, the controller 108 may rotate the configuration of the objects through a prescribed angle to implement rearrangement. In this case, the controller 108 may rearrange the objects into line symmetry with respect to an arbitrary line. After the step S1805, the current execution cycle of the program ends.

Thus, in the case where user's operation of touching the touch screen 201 is terminated after the touch positions 401 and 402 are vibrated, the controller 108 rearranges the objects in the rectangular area 450. Accordingly, the user can rearrange desired ones among objects indicated on the touch screen 201 by taking a sequence of simple actions as follows. The user selects desired objects and then vibrates user's fingers on the touch screen 201 without separating them from the touch screen 201. Thereafter, the user separates user's fingers from the touch screen 201.

Figure 19A:
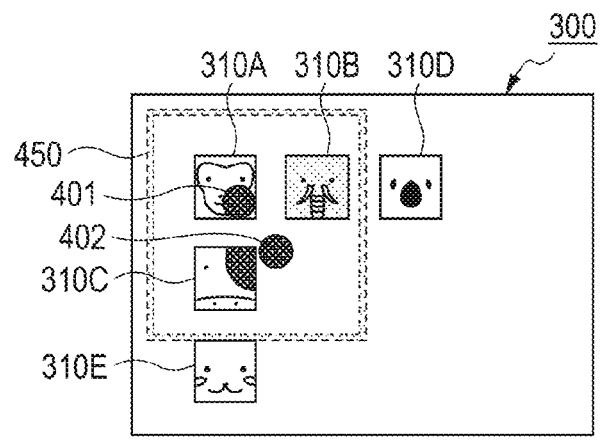
FIGS. 19(a) and 19(b) are diagrams of examples of the large-size picture which occur during a menu indicating process.
Figure 19B:
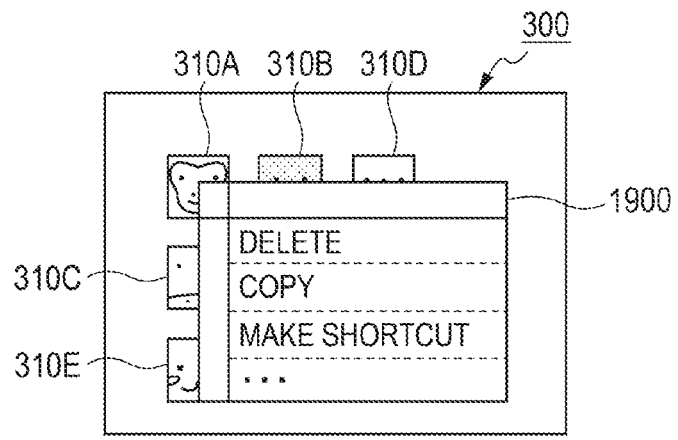
Figure 20:
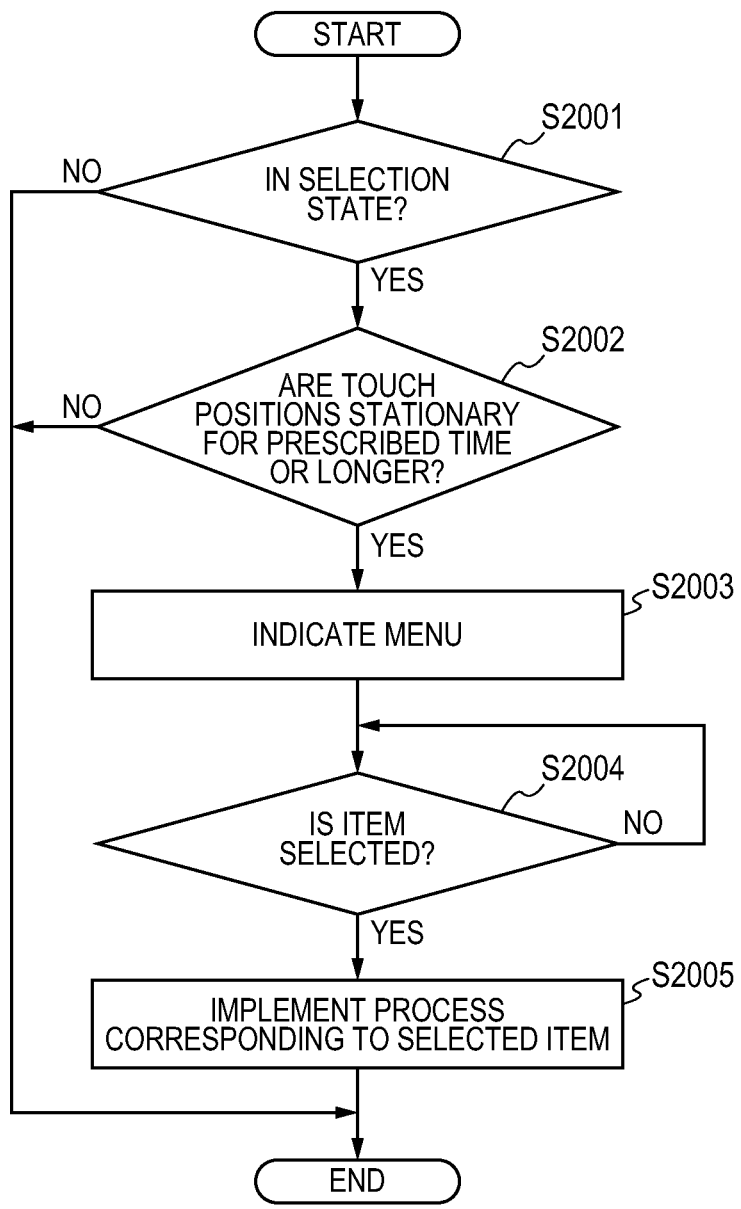
FIG. 20 is a flowchart of a computer program for the menu-indicating process.

With reference to FIGS. 19(a), 19(b), and 20, a description will be made below about a process of indicating a menu of commands the user can give with respect to selected ones among objects indicated on the touch screen 201. The menu indicating process follows the selecting process. While implementing the menu indicating process, the controller 108 repetitively acquires a touch position or positions from the input receiving unit 105 on a background operation basis.

FIG. 20 is a flowchart of a control program (computer program) for the menu indicating process. In the first step S2001 of the program, the controller 108 decides whether or not a large-size picture 300 is in its selection state. FIG. 19(a) shows an example of the large-size picture 300 in its selection state. In FIG. 19(a), a rectangular area 450 is set in the large-size picture 300, and icons 310A, 310B, and 310C are contained in the rectangular area 450. Thus, the icons 310A, 310B, and 310C are selected by the user.

When it is decided in the step S2001 that the large-size picture 300 is in its selection state, the program advances from the step S2001 to a step S2002. Otherwise, the program exits from the step S2001, and then the current execution cycle of the program ends.

In the step S2002, the controller 108 decides whether or not two touch positions 401 and 402 continue to be substantially stationary for at least a prescribed time interval, that is, whether or not the user holds user's fingers in stationary contact with the touch screen 201 for at least the prescribed time interval. The controller 108 may calculate a variation (movement) of the first touch position 401 and a variation (movement) of the second touch position 402, and decide whether or not both the calculated variations remain within a prescribed allowable range for at least the prescribed time interval. In the case where the touch positions 401 and 402 remain substantially the same for at least the prescribed time interval or both the variations (movements) of the touch positions 401 and 402 remain within the prescribed allowable range for at least the prescribed time interval, the controller 108 decides that the touch positions 401 and 402 continue to be substantially stationary for at least the prescribed time interval. Otherwise, the controller 108 decides that the touch positions 401 and 402 do not continue to be stationary.

When it is decided in the step S2002 that the touch positions 401 and 402 continue to be substantially stationary for at least the prescribed time interval, the program advances from the step S2002 to a step S2003. Otherwise, the program exits from the step S2002, and then the current execution cycle of the program ends.

In the step S2003, the controller 108 indicates a menu 1900 of commands the user can give on the touch screen 201 as shown in FIG. 19(b). The menu 1900 is a list of commands the user can give. For example, the menu 1900 has an item assigned to a command "delete" corresponding to the deleting process, an item assigned to a command "copy" corresponding to the copying process, and items assigned to commands corresponding to other processes. After the step S2003, the program advances to a step S2004.

Preferably, the user can select one from the items (commands) in the indicated menu 1900 by bringing user's finger into contact with the place of the to-be-selected item on the touch screen 201. The controller 108 can detect user's selection of one from the items by referring to an output signal from the input reception unit 105.

In the step S2004, the controller 108 decides whether or not one of the items (commands) in the menu 1900 is selected by the user. When it is decided that one of the items in the menu 1900 is selected, the program advances from the step S2004 to a step S2005. Otherwise, the step S2004 is repeated. Thus, the controller 108 waits until one of the items in the menu 1900 is selected.

In the step S2005, the controller 108 identifies the selected item and implements a process corresponding to the selected item. After the step S2005, the current execution cycle of the program ends.

In the case where two touch positions 401 and 402 are detected and acquired and thereafter they continue to be substantially stationary for at least the prescribed time interval, the controller 108 indicates a list of commands the user can give with respect to a selected object or objects on the touch screen 201. Thus, the user can obtain a list of commands the user can give with respect to a selected object or objects by holding substantially stationary user's fingers which contact the touch screen 201.

Each of the selecting process, the moving process, the deleting process, the copying process, the rearranging process, and the menu indicating process can be implemented in accordance with a simple action or a sequence of simple actions taken by the user. For example, the user can subject a plurality of objects to a desired common process by taking a sequence of simple actions as follows. The user touches the touch screen 201 with two fingers in a manner such that the target objects are roughly between the tips of the fingers in contact with the touch screen 201. As a result, a rectangular area 450 is set in a large-size picture 300 on the touch screen 201, and the target objects are in the rectangular area 450 and are thus selected. Subsequently, the user holds user's fingers in contact with the touch screen 201 and slides or twists them on the touch screen 201 before separating them from the touch screen 201.

For the moving process, the user is required to select an object or objects to be moved, and decide a destination and command movement. The user can implement selecting an object or objects to be moved, deciding a destination, and commanding movement by taking a substantially nonstop sequence of simple actions, that is, bringing user's fingers into contact with the touch screen 201 and sliding them on the touch screen 201 and then separating them from the touch screen 201.

Regardless of whether only a single object to be processed is present or plural objects to be processed are present, the user can implement each of the above-mentioned processes by taking a same simple action or a same sequence of simple actions. Thus, to implement each of the above-mentioned processes, it is unnecessary for the user to perform troublesome operation.

An arbitrary process differing from the moving process, the deleting process, the copying process, the rearranging process, and the menu indicating process may be combined with the selecting process. In this case, provided that user's actions for the arbitrary process are defined beforehand, the user can implement the arbitrary process by taking a sequence of simple actions.

This invention is not limited to the above-described embodiment thereof. This invention contains many variations, modifications, and changes from the embodiment thereof. For example, the computer program or programs for operation of at least a portion of the electronic apparatus 100 may be distributed while being stored in a computer-readable recording medium such as a memory card, a CD-ROM, a DVD, or an MO (magneto-optical disc). In this case, installing the computer program or programs on a computer or a computer-based device from the recording medium enables the computer or the computer-based device to operate as the electronic apparatus 100 or perform steps equal to those done by the electronic apparatus 100. The computer program or programs may be stored in a storage device possessed by a server on the Internet. In this case, the computer program or programs are downloaded into a computer or a computer-based device via the Internet so that the computer or the computer-based device can operate as the electronic apparatus 100 or can perform steps equal to those done by the electronic apparatus 100.

The electronic apparatus 100 is, for example, a cellular phone, an e-book reader, an electronic notebook, an electronic dictionary, a personal computer, or a portable game machine.

What is claimed is:

1. An electronic apparatus comprising:
   a display;
   an indicating section for indicating objects on the display;
   a touch panel superposed on the display;

an acquiring section for detecting user's touches to the touch panel and acquiring positions of the user's touches to the touch panel as touch positions; and a selecting section for deciding whether or not first and second touch positions are acquired by the acquiring section, for calculating a distance between the first and second touch positions, and for deciding whether or not the calculated distance between the first and second touch positions decreases in accordance with the lapse of time;

the selecting section being further for setting a rectangular area with respect to the display and selecting an object or objects contained in the rectangular area in cases where it is decided that the first and second touch positions are acquired and the distance between the first and second touch positions decreases in accordance with the lapse of time;

wherein two opposite corners of the rectangular area are respectively coincident with the first and second touch positions occurring at an initial stage of the user's touches to the touch panel;

wherein the selecting section is for deriving a first vector extending from the first touch position occurring at a first moment to the first touch position occurring at a second moment after the first moment, for deriving a straight line connecting the first and second touch positions occurring at the first moment, for deriving a second vector extending from the second touch position occurring at the first moment to the second touch position occurring at the second moment, for calculating a first angle between the first vector and the straight line, for calculating a second angle between the second vector and the straight line, for deciding whether or not the first angle is smaller than a prescribed angle, and for deciding whether or not the second angle is smaller than the prescribed angle; and wherein the selecting section is for setting the rectangular area and selecting the object or objects contained in the rectangular area in cases where it is decided that the distance between the first and second touch positions decreases in accordance with the lapse of time, the first angle is smaller than the prescribed angle, and the second angle is smaller than the prescribed angle.

2. The electronic apparatus as recited in claim 1, further comprising a moving section for deciding whether or not the distance between the first and second touch positions is substantially constant after the object or objects contained in the rectangular area are selected by the selecting section, for deciding whether or not the first and second touch positions are slid in substantially a same direction after the object or objects contained in the rectangular area are selected by the selecting section, and for, in cases where it is decided that the distance between the first and second touch positions is substantially constant and the first and second touch positions are slid in substantially a same direction, moving the selected object or objects along said same direction.

3. The electronic apparatus as recited in claim 2, wherein the moving section is for calculating a first distance between the first and second touch positions occurring at a first moment, for calculating a second distance between the first and second touch positions occurring at a second moment after the first moment, for calculating a variation between the first distance and the second distance, for deciding whether or not the calculated variation is within a prescribed allowable range, for deriving a first vector extending from the first touch position occurring at the first moment to the first touch position occurring at the second moment, for deriving a second vector extending from the second touch position occurring at the first moment to the second touch position occurring at the second moment, for calculating an angle between the first and second vectors, for deciding whether or not the calculated angle is smaller than a prescribed angle, and for moving the selected object or objects along said same direction in cases where the calculated variation is within the prescribed allowable range and the calculated angle is smaller than the prescribed angle.

4. The electronic apparatus as recited in claim 1, further comprising a deleting section for deciding whether or not the first and second touch positions are rotated in a same direction after the object or objects contained in the rectangular area are selected by the selecting section, and for deleting the selected object or objects in cases where it is decided that the first and second touch positions are rotated in a same direction.

5. The electronic apparatus as recited in claim 4, wherein the deleting section is for deriving a first locus of the first touch position from a first moment to a second moment after the first moment, for deriving a second locus of the second touch position from the first moment to the second moment, for deriving a first circle approximate to the first locus, for deriving a second circle approximate to the second locus, for calculating a distance between the centers of the first and second circles, for deciding whether or not the calculated distance between the centers is smaller than a prescribed distance, and for deleting the selected object or objects in cases where it is decided that the calculated distance between the centers is smaller than the prescribed distance and the first and second touch positions are rotated in a same direction.

6. The electronic apparatus as recited in claim 1, further comprising a copying section for deciding whether or not the distance between the first and second touch positions is substantially constant after the object or objects contained in the rectangular area are selected by the selecting section, for deciding whether or not the first and second touch positions are slid in substantially a same direction after the object or objects contained in the rectangular area are selected by the selecting section, for deciding whether or not the distance between the first and second touch positions increases in accordance the lapse of time after the first and second touch positions are slid in substantially a same direction, for copying the object or objects contained in the rectangular area to generate a copy-resultant object or objects, and for placing the copy-resultant object or objects at locations depending on the first and second touch positions occurring when the user's touches to the touch panel are terminated.

7. The electronic apparatus as recited in claim 6, wherein the copying section is for deriving a first vector extending from the first touch position occurring at a first moment to the first touch position occurring at a second moment after the first moment, for deriving a second vector extending from the second touch position occurring at the first moment to the second touch position occurring at the second moment, for deriving a straight line connecting the first and second touch positions occurring at the first moment, for calculating a first angle between the first vector and the straight line, for calculating a second angle between the second vector and the straight line, for deciding whether or not the first and second angles are smaller than a prescribed angle, and for, in cases where it is decided that the first and second angles are smaller than the prescribed angle and thereafter the distance between the first and second touch positions increases in accordance with the lapse of time, copying the object or objects contained in the rectangular area to generate a copy-resultant object or objects and then placing the copy-resultant object or objects at locations depending on the first and second touch positions occurring when the user's touches to the touch panel are terminated.

8. The electronic apparatus as recited in claim 1, further comprising a rearranging section for deciding whether or not the distance between the first and second touch positions is substantially constant after the object or objects contained in the rectangular area are selected by the selecting section, for deciding whether or not the first and second touch positions are vibrated after the object or objects contained in the rectangular area are selected by the selecting section, and for rearranging the objects contained in the rectangular area in cases where it is decided that the distance between the first and second touch positions is substantially constant and the first and second touch positions are vibrated.

9. The electronic apparatus as recited in claim 8, wherein the rearranging section is for calculating a first distance between the first and second touch positions occurring at a first moment, for calculating a second distance between the first and second touch positions occurring at a second moment after the first moment, for deciding whether or not the first and second distances are substantially equal, for deriving a first vector extending from the first touch position occurring at the first moment to the first touch position occurring at the second moment, for deriving a second vector extending from the second touch position occurring at the first moment to the second touch position occurring at the second moment, for deciding whether or not the first and second vectors are substantially equal in length and direction, and for rearranging the objects contained in the rectangular area in cases where it is decided that the first and second distances are substantially equal and the first and second vectors are substantially equal in length and direction.

10. The electronic apparatus as recited in claim 1, further comprising a menu indicating section for calculating a first variation of the first touch position after the object or objects contained in the rectangular area are selected by the selecting section, and for calculating a second variation of the second touch position after the object or objects contained in the rectangular area are selected by the selecting section, for deciding whether or not both the first and second variations remain within a prescribed allowable range for at least a prescribed time interval, and for indicating a list of commands a user can give with respect to the object or objects contained in the rectangular area in cases where it is decided that both the first and second variations remain within the prescribed allowable range for at least the prescribed time interval.

11. A method of controlling an electronic apparatus, comprising the steps of:
    indicating objects on a display;
    detecting user's touches to a touch panel superposed on the display and acquiring positions of the user's touches to the touch panel as touch positions;
    deciding whether or not first and second touch positions are acquired by the detecting and acquiring step;
    calculating a distance between the first and second touch positions;
    deciding whether or not the calculated distance between the first and second touch positions decreases in accordance with the lapse of time; and
    setting a rectangular area with respect to the display and selecting an object or objects contained in the rectangular area in cases where it is decided that the first and second touch positions are acquired and the distance between the first and second touch positions decreases in accordance with the lapse of time;
    wherein two opposite corners of the rectangular area are respectively coincident with the first and second touch positions occurring at an initial stage of the user's touches to the touch panel;
    wherein the setting and selecting step comprises deriving a first vector extending from the first touch position occurring at a first moment to the first touch position occurring at a second moment after the first moment, deriving a straight line connecting the first and second touch positions occurring at the first moment, deriving a second vector extending from the second touch position occurring at the first moment to the second touch position occurring at the second moment, calculating a first angle between the first vector and the straight line, calculating a second angle between the second vector and the straight line, deciding whether or not the first angle is smaller than a prescribed angle, and deciding whether or not the second angle is smaller than the prescribed angle; and
    wherein the setting and selecting step further comprises setting the rectangular area and selecting the object or objects contained in the rectangular area in cases where it is decided that the distance between the first and second touch positions decreases in accordance with the lapse of time, the first angle is smaller than the prescribed angle, and the second angle is smaller than the prescribed angle.

12. A non-transitory computer readable medium storing a computer program causing a computer to implement:
    an indicating section for indicating objects on a display;
    an acquiring section for detecting user's touches to a touch panel superposed on the display and acquiring positions of the user's touches to the touch panel as touch positions; and
    a selecting section for deciding whether or not first and second touch positions are acquired by the acquiring section, for calculating a distance between the first and second touch positions, and for deciding whether or not the calculated distance between the first and second touch positions decreases in accordance with the lapse of time;
    the selecting section being further for setting a rectangular area with respect to the display and selecting an object or objects contained in the rectangular area in cases where it is decided that the first and second touch positions are acquired and the distance between the first and second touch positions decreases in accordance with the lapse of time;
    wherein two opposite corners of the rectangular area are respectively coincident with the first and second touch positions occurring at an initial stage of the user's touches to the touch panel;
    wherein the selecting section is for deriving a first vector extending from the first touch position occurring at a first moment to the first touch position occurring at a second moment after the first moment, for deriving a straight line connecting the first and second touch positions occurring at the first moment, for deriving a second vector extending from the second touch position occurring at the first moment to the second touch position occurring at the second moment, for calculating a first angle between the first vector and the straight line, for calculating a second angle between the second vector and the straight line, for deciding whether or not the first angle is smaller than a prescribed angle, and for deciding whether or not the second angle is smaller than the prescribed angle; and wherein the selecting section is for setting the rectangular area and selecting the object or objects contained in the rectangular area in cases where it is decided that the distance between the first and second touch positions decreases in accordance with the lapse of time, the first angle is smaller than the prescribed angle, and the second angle is smaller than the prescribed angle.

\* \* \* \* \*